(12) United States Patent
Kisara et al.

(10) Patent No.: US 11,086,511 B2
(45) Date of Patent: Aug. 10, 2021

(54) OPERATION INPUT DEVICE, INFORMATION PROCESSING SYSTEM, AND OPERATION DETERMINING METHOD

(71) Applicant: Mitsubishi Electric Corporation, Tokyo (JP)

(72) Inventors: Daisuke Kisara, Tokyo (JP); Yuichi Sasaki, Tokyo (JP); Atsushi Hori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/831,501

(22) Filed: Mar. 26, 2020

(65) Prior Publication Data
US 2020/0225842 A1    Jul. 16, 2020

Related U.S. Application Data

(63) Continuation of application No. PCT/JP2017/036779, filed on Oct. 11, 2017.

(51) Int. Cl.
*G06F 3/0488* (2013.01)
*G06F 3/044* (2006.01)

(52) U.S. Cl.
CPC .......... *G06F 3/04883* (2013.01); *G06F 3/044* (2013.01); *G06F 2203/04104* (2013.01)

(58) Field of Classification Search
CPC ............... G06F 3/03; G06F 3/04883; G06F 2203/04104; G06F 2203/04808; G06F 3/044
See application file for complete search history.

(56) References Cited

U.S. PATENT DOCUMENTS

| | | | |
|---|---|---|---|
| 9,134,830 B1* | 9/2015 | Lee | G06F 3/041 |
| 2011/0018828 A1* | 1/2011 | Wu | G06F 3/04883 |
| | | | 345/173 |
| 2011/0080341 A1* | 4/2011 | Helmes | G06F 3/04883 |
| | | | 345/163 |
| 2012/0113061 A1 | 5/2012 | Ikeda | |
| 2014/0222335 A1* | 8/2014 | Piemonte | G06F 3/04883 |
| | | | 701/527 |
| 2015/0293622 A1* | 10/2015 | Han | H04W 12/06 |
| | | | 345/174 |
| 2017/0371474 A1* | 12/2017 | Ligameri | G06F 3/03545 |

FOREIGN PATENT DOCUMENTS

| | | |
|---|---|---|
| JP | 2012-168612 A | 9/2012 |
| JP | 2013-178678 A | 9/2013 |
| JP | 5482023 B2 | 4/2014 |
| JP | 5705767 B2 | 4/2015 |

OTHER PUBLICATIONS

International Search Report dated Nov. 28, 2017 in PCT/JP2017/036779 filed Oct. 11, 2017.
Japanese Office Action dated May 8, 2018 in Japanese Patent Application No. 2018-515907.

* cited by examiner

*Primary Examiner* — Muhammad N Edun
(74) *Attorney, Agent, or Firm* — Birch, Stewart, Kolasch & Birch, LLP.

(57) ABSTRACT

The operation input device determines an operation of one or a plurality of operation devices on the basis of the distance between touch points and the positional relationship of three or more touch points, and determines an operation corresponding to the touch point determined not to depend on the operation device as a touch operation.

8 Claims, 16 Drawing Sheets

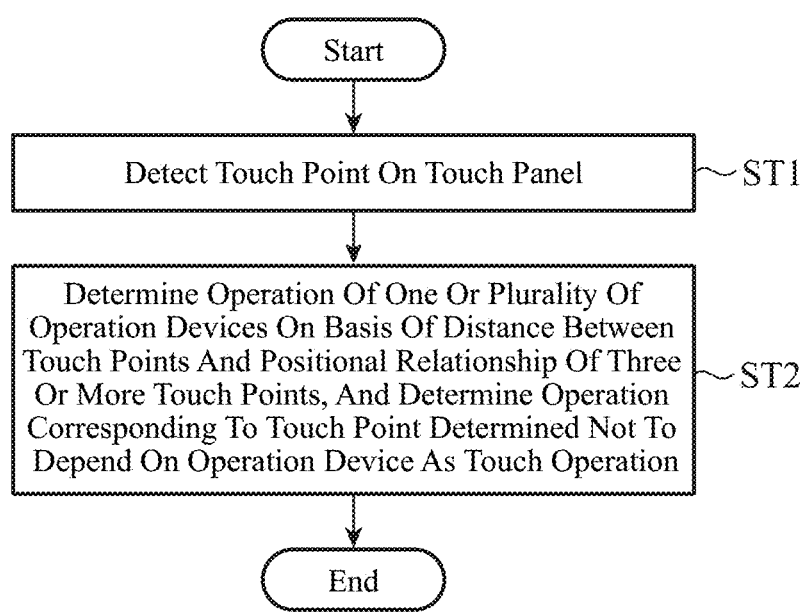

FIG. 17
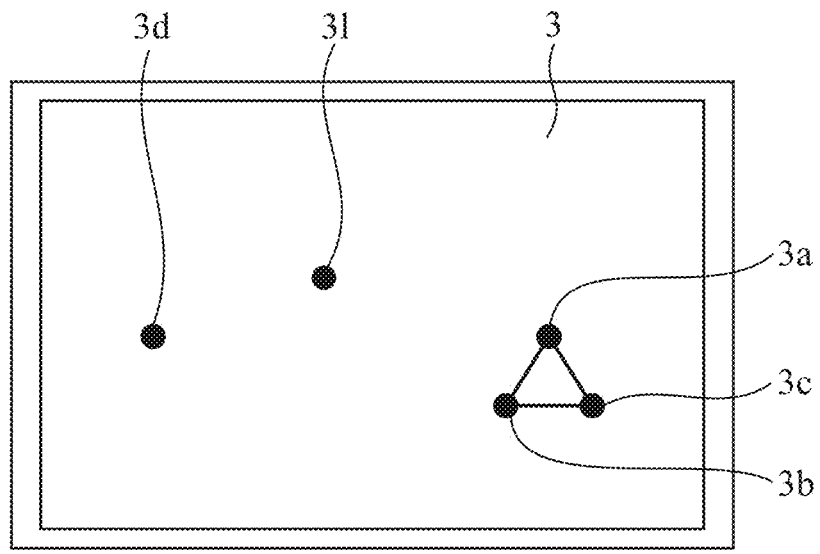
FIG. 18
| Shape | Priority Order |
|---|---|
| Equilateral Triangle | 1 |
| Square | 2 |
| Rectangle | 3 |
| Right Triangle | 4 |
| Regular Pentagon | 5 |
FIG. 19
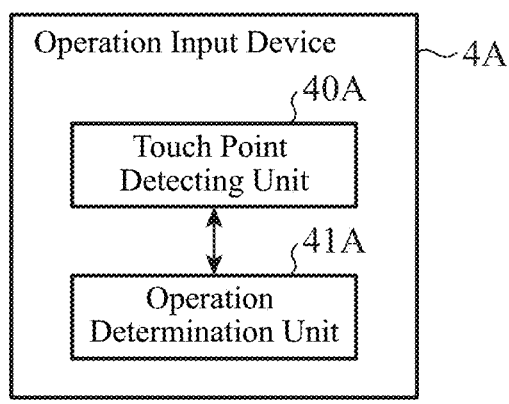

OPERATION INPUT DEVICE, INFORMATION PROCESSING SYSTEM, AND OPERATION DETERMINING METHOD

CROSS REFERENCE TO RELATED APPLICATION

This application is a Continuation of PCT International Application No. PCT/JP2017/036779, filed on Oct. 11, 2017, which is hereby expressly incorporated by reference into the present application.

TECHNICAL FIELD

The present invention relates to an operation input device, an information processing system, and an operation determination method for receiving an operation input using an operation device arranged on a touch panel.

BACKGROUND ART

Conventionally, an information processing system including an operation device arranged on a touch panel has been used. For example, Patent Document 1 describes a system including a touch panel, an operation device arranged on the touch panel, and an information processing device. In this system, the touch panel detects a touch point by a conductive portion touched by an operator's hand among a plurality of conductive portions included in the operation device. The information processing device specifies an arrangement pattern of touch points by a plurality of conductive portions detected by the touch panel, and executes a process associated with the arrangement pattern.

CITATION LIST

Patent Literatures

Patent Literature 1: JP 2013-178678 A

SUMMARY OF INVENTION

Technical Problem

However, since the system described in Patent Document 1 is premised on an operation using a single operation device, there is a problem that the types of operations that can be received are limited.

This invention solves the problem and aims at obtaining an operation input device, an information processing system, and an operation determination method which can increase the types of operations that can be received.

Solution to Problem

The operation input device according to the present invention includes a processor, and a memory storing instructions which, when executed by the processor, causes the processor to perform processes of: detecting a touch point on a touch panel; and determining an operation of one or a plurality of operation devices arranged on the touch panel on a basis of a distance between touch points specified from information on detected touch points and a positional relationship of three or more touch points, and determining an operation corresponding to a touch point that is determined not to depend on the operation device in the determination as a touch operation on the touch panel.

Advantageous Effects of Invention

According to the present invention, the operation of one or a plurality of operation devices is determined on the basis of a distance between touch points and a positional relationship of three or more touch points, and an operation corresponding to a touch point that does not depend on the operation device is determined as a touch operation. This can increase types of operations that can be received.

BRIEF DESCRIPTION OF DRAWINGS

FIG. 4 is a flowchart showing an operation determination method according to the first embodiment.

FIG. 17 is a diagram showing a case where there are only two touch points to be determined.

FIG. 18 is a diagram showing a relationship between a reference shape of an operation device and a priority order.

FIG. 19 is a block diagram showing a functional configuration of an operation input device according to a second embodiment of the present invention.

DESCRIPTION OF EMBODIMENTS

Hereinafter, in order to explain this invention in more detail, a mode for carrying out the present invention will be described with reference to the accompanying drawings.

First Embodiment

Figure 1:
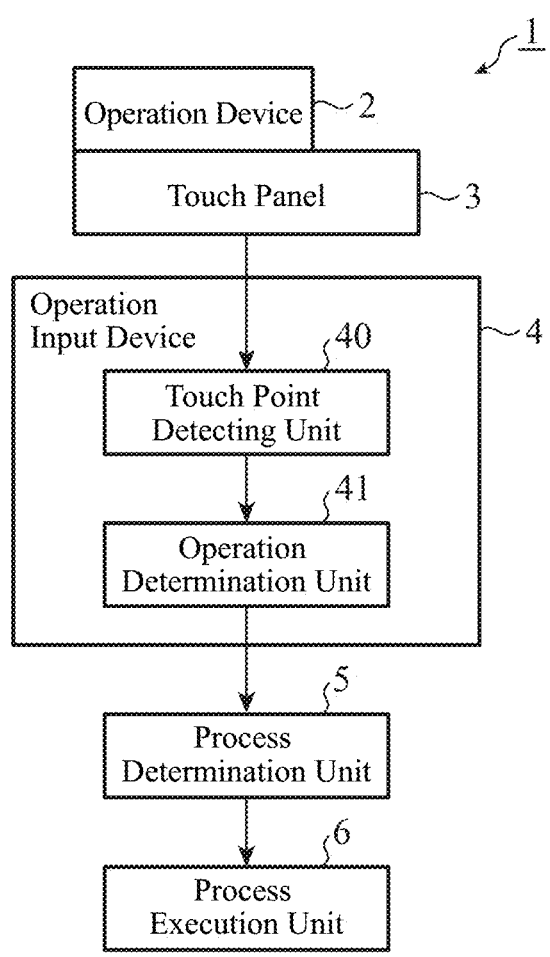
FIG. 1 is a block diagram showing a configuration of an information processing system according to a first embodiment of the present invention.

FIG. 1 is a block diagram showing a configuration of an information processing system 1 according to a first embodiment of the present invention. In the information processing system 1, one or a plurality of operation devices 2 is arranged on a touch panel 3, and a process corresponding to an operation received by the touch panel 3 is executed.

The touch panel 3 is, for example, an electrostatic capacitance type touch panel, and receives an operation of the operation device 2 in addition to receiving an operator's touch operation. The touch operation includes gesture operations to the touch panel 3 such as tap, double tap, slide, swipe, long press, pinch and stretch.

An operation input device 4 detects a touch point corresponding to the operation received by the touch panel 3, and determines the operation corresponding to the detected touch point. For example, the operation input device 4 determines whether the type of operation corresponding to the touch point on the touch panel 3 is an operator's touch operation, an operation of one operation device 2, an operation obtained by combining operations of a plurality of operation devices 2, or an operation obtained by combining the operator's touch operation and the operation of one or a plurality of operation devices 2.

A process determination unit 5 determines a process corresponding to an operation determined by the operation input device 4. For example, the process determination unit 5 determines a process corresponding to the type of operation determined by the operation input device 4 with reference to table data in which the type of operation is associated with the content of the process.

A process execution unit 6 executes the process determined by the process determination unit 5.

Note that, although FIG. 1 shows a configuration in which the operation input device 4 does not include the process determination unit 5 and the process execution unit 6, each of the process determination unit 5 and the process execution unit 6 may be a constituent element included in the operation input device 4.

The operation input device 4 includes a touch point detecting unit 40 and an operation determination unit 41. The touch point detecting unit 40 detects a touch point on the touch panel 3.

The operation determination unit 41 determines an operation of one or a plurality of operation devices 2 arranged on the touch panel 3 on the basis of a distance between touch points specified from touch information on the touch points detected by the touch point detecting unit 40 and a positional relationship of three or more touch points. The touch information is information including an identification number and position coordinates of the touch point, a contact state and a detected value of an electrostatic capacitance of a touched object (operator's finger or conductor columnar support) at the touch point.

The operation determination unit 41 determines an operation corresponding to a touch point that does not depend on the operation device 2 as a touch operation on the touch panel 3.

Figure 2A:
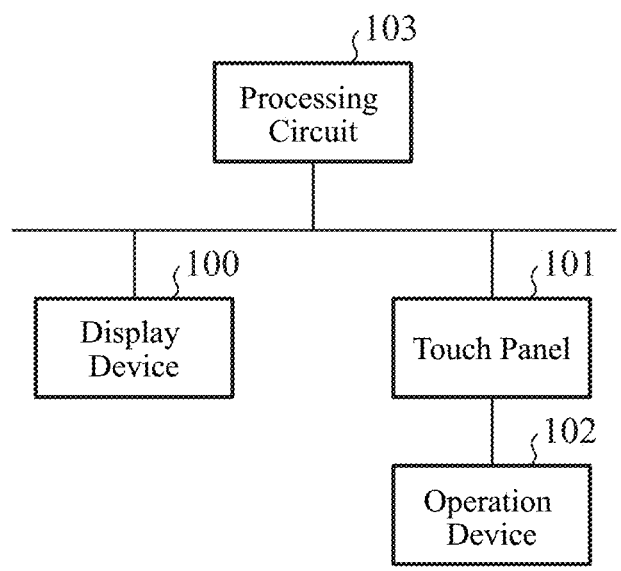
FIG. 2A is a block diagram showing a hardware configuration for implementing functions of an operation input device according to the first embodiment.
Figure 2B:
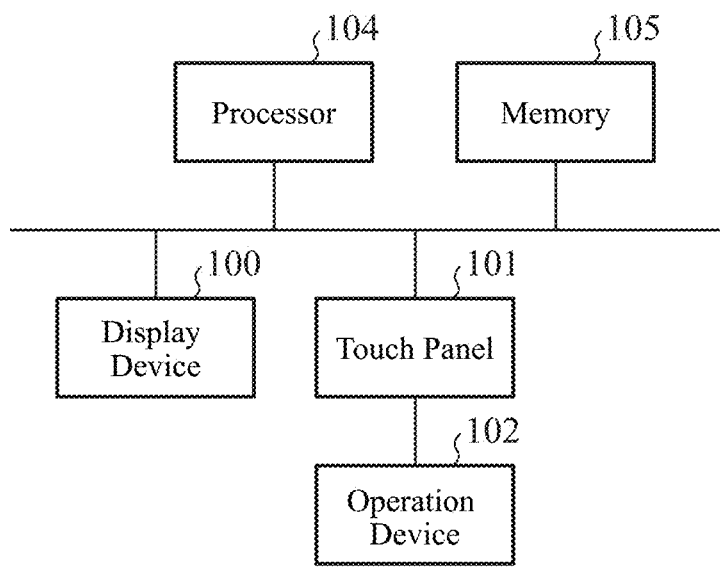
FIG. 2B is a block diagram showing a hardware configuration for executing software that implements functions of the operation input device according to the first embodiment.

FIG. 2A is a block diagram showing a hardware configuration for implementing the functions of the operation input device 4. FIG. 2B is a block diagram showing a hardware configuration for executing software that implements the functions of the operation input device 4. In FIGS. 2A and 2B, a display device 100 is a display device that displays an operation screen, and a touch panel 101 is arranged on the display surface. The touch panel 101 is the touch panel 3 shown in FIG. 1. An operation device 102 is the operation device 2 shown in FIG. 1 and is arranged on the touch panel 101.

The functions of the touch point detecting unit 40 and the operation determination unit 41 included in the operation input device 4 are implemented by a processing circuit. That is, the operation input device 4 includes a processing circuit for executing each process of a flowchart shown in FIG. 4. The processing circuit may be dedicated hardware or a central processing unit (CPU) that executes a program stored in a memory 105.

In a case where the processing circuit is dedicated hardware shown in FIG. 2A, a processing circuit 103 corresponds, for example, to a single circuit, a composite circuit, a programmed processor, a parallel-programmed processor, an application specific integrated circuit (ASIC), a field-programmable gate array (FPGA), or a combination thereof. The functions of the touch point detecting unit 40 and the operation determination unit 41 may be implemented by separate processing circuits, or these functions may be collectively implemented by a single processing circuit.

When the processing circuit is a processor 104 shown in FIG. 2B, the functions of the touch point detecting unit 40 and the operation determination unit 41 are implemented by software, firmware, or a combination of software and firmware. Software or firmware is described as a program and stored in the memory 105.

The processor 104 reads out and executes a program stored in the memory 105, thereby implementing the function of each of the touch point detecting unit 40 and the operation determination unit 41. That is, the operation input device 4 includes the memory 105 for storing programs, when they are executed by the processor 104, by which each of a series of processing shown in FIG. 4 is resultantly executed. These programs cause a computer to execute the procedures or methods of the touch point detecting unit 40 and the operation determination unit 41.

Examples of the memory 105 correspond to a nonvolatile or volatile semiconductor memory, such as a random access memory (RAM), a read only memory (ROM), a flash memory, an erasable programmable read only memory (EPROM), or an electrically-EPROM (EEPROM), a magnetic disk, a flexible disk, an optical disk, a compact disk, a mini disk, and a DVD.

Part of the functions of the touch point detecting unit 40 and the operation determination unit 41 may be implemented by dedicated hardware, and part of the functions may be implemented by software or firmware. For example, the function of the touch point detecting unit 40 may be implemented by the processing circuit 103 that is dedicated hardware, and the function of the operation determination unit 41 may be implemented by the processor 104 reading and executing a program stored in the memory 105. Thus, the processing circuit can implement each of the above functions by hardware, software, firmware, or a combination thereof.

Figure 3C:
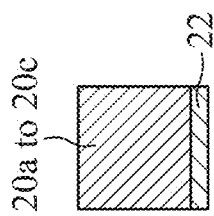
FIG. 3C is an enlarged cross-sectional view showing a conductor columnar support and a bottom surface part included in the operation device in the first embodiment.
Figure 3B:
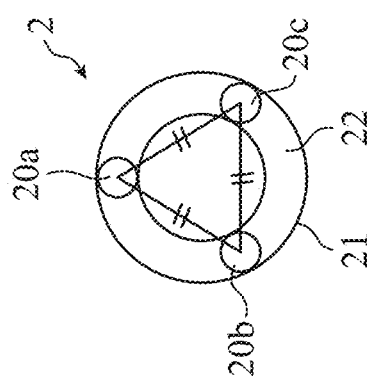
FIG. 3B is a top view showing the operation device in the first embodiment.
Figure 3A:
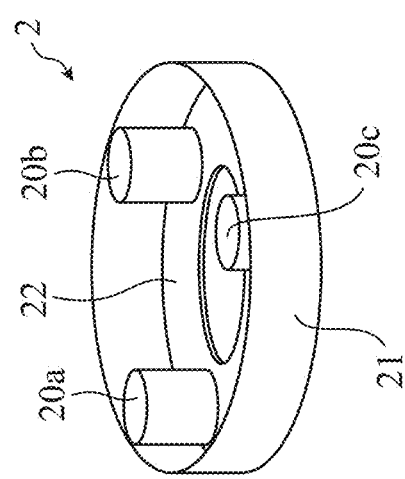
FIG. 3A is a perspective view showing an operation device in the first embodiment.

FIG. 3A is a perspective view showing the operation device 2. FIG. 3B is a top view showing the operation device 2. FIG. 3C is an enlarged cross-sectional view showing conductor columnar supports 20a to 20c and a bottom surface part 22 provided in the operation device 2. As shown in FIG. 3A, the operation device 2 is a knob-type operation device, can be rotated by an operator, and can also be slid on the touch panel 3.

The operation device 2 is provided with the conductor columnar supports 20a to 20c, a side wall part 21, and a bottom surface part 22. As shown in FIG. 3C, the conductor columnar supports 20a to 20c are columnar supports attached on the bottom surface part 22, and are made of a conductive material. In the illustrated operation device 2, as shown in FIG. 3B, the conductor columnar supports 20a to 20c are arranged on the bottom surface part 22 at equal intervals, and the shape with the conductor columnar supports 20a to 20c as vertices is an equilateral triangle.

As shown in FIGS. 3A and 3B, the side wall part 21 is a frame-shaped member that surrounds the conductor columnar supports 20a to 20c, and is made of a conductive material. The bottom surface part 22 is an annular member made of resin, and is configured to be thin enough to allow the touch panel 3 to detect the electrostatic capacitances of the conductor columnar supports 20a to 20c. The bottom surface part 22 is interposed between the end surfaces of the conductor columnar supports 20a to 20c and the touch panel 3, and each of the end surfaces of the conductor columnar supports 20a to 20c in contact with the bottom surface part 22 has an area that can be detected by the touch panel 3.

Since the potential of the operator can be considered as a ground potential, the electrostatic capacitance of a portion touched by the operator on the touch panel 3 changes (changes in the direction in which the electrostatic capacitance increases). The electrostatic capacitance type touch panel 3 detects the change in electrostatic capacitance, and the touch point detecting unit 40 detects a portion where the change in electrostatic capacitance is detected by the touch panel 3 as a touch point.

Similarly, when the operator touches the operation device 2, the potential of the operation device 2 decreases, and the electrostatic capacitances of the conductor columnar supports 20a to 20c change. The touch panel 3 detects changes in the electrostatic capacitances of the conductor columnar supports 20a to 20c, and the touch point detecting unit 40 detects portions where the conductor columnar supports 20a to 20c are provided as touch points. Since the shape with the conductor columnar supports 20a to 20c as vertices is an equilateral triangle, the shape with three touch points detected by the operation of the operation device 2 as vertices is also an equilateral triangle. This shape becomes the reference shape when the operation of the operation device 2 is determined.

Although FIGS. 3A and 3B show the case where the operation device 2 includes three conductor columnar supports 20a to 20c, it may include three or more conductor columnar supports. Further, the shape (reference shape) with the conductor columnar supports as vertices may be another polygon such as a right triangle, an isosceles triangle, a square, a regular pentagon, or a rectangle. Furthermore, an operable process for the operation device 2 may be set for each reference shape. For example, temperature adjusting process of an air conditioner is set for an operation device whose reference shape is an equilateral triangle, and a volume adjustment process is set for an operation device whose reference shape is a right triangle.

The operation will be described next.

FIG. 4 is a flowchart showing an operation determination method according to the first embodiment.

In step ST1, the touch point detecting unit 40 detects a touch point on the touch panel 3. For example, the touch point detecting unit 40 detects all the portions where the change in electrostatic capacitance is detected by the touch panel 3 as touch points, and outputs touch information regarding these touch points to the operation determination unit 41. Further, the contact state of the touched object includes the contact area and the depressing pressure of the touched object with respect to the touch panel 3.

In step ST2, the operation determination unit 41 specifies the distance and the positional relationship between the touch points at the plurality of touch points on the basis of the plurality of pieces of touch information input from the touch point detecting unit 40. The operation determination unit 41 determines the operation of one or a plurality of operation devices 2 on the basis of the distance and the positional relationship between the touch points at the specified plurality of touch points, and determines the operation corresponding to a touch point that does not depend on the operation device 2 as a touch operation on the touch panel 3.

The process determination unit 5 determines a process corresponding to the operation determined by the operation determination unit 41. For example, when the operation determination unit 41 has determined an operation of one operation device 2 and an operator's touch operation, the process determination unit 5 determines a process corresponding to the operation that is the combination of the operation of one operation device 2 and the operator's touch operation. When the operation determination unit 41 has determined the operations of the plurality of operation devices 2, the process determination unit 5 determines a process corresponding to the operation that is the combination of the plurality of operation devices 2. The process determined by the process determination unit 5 is notified to the process execution unit 6. The process execution unit 6 executes the process notified from the process determination unit 5.

Next, details of the operation determination method according to the first embodiment will be described.

Figure 5:
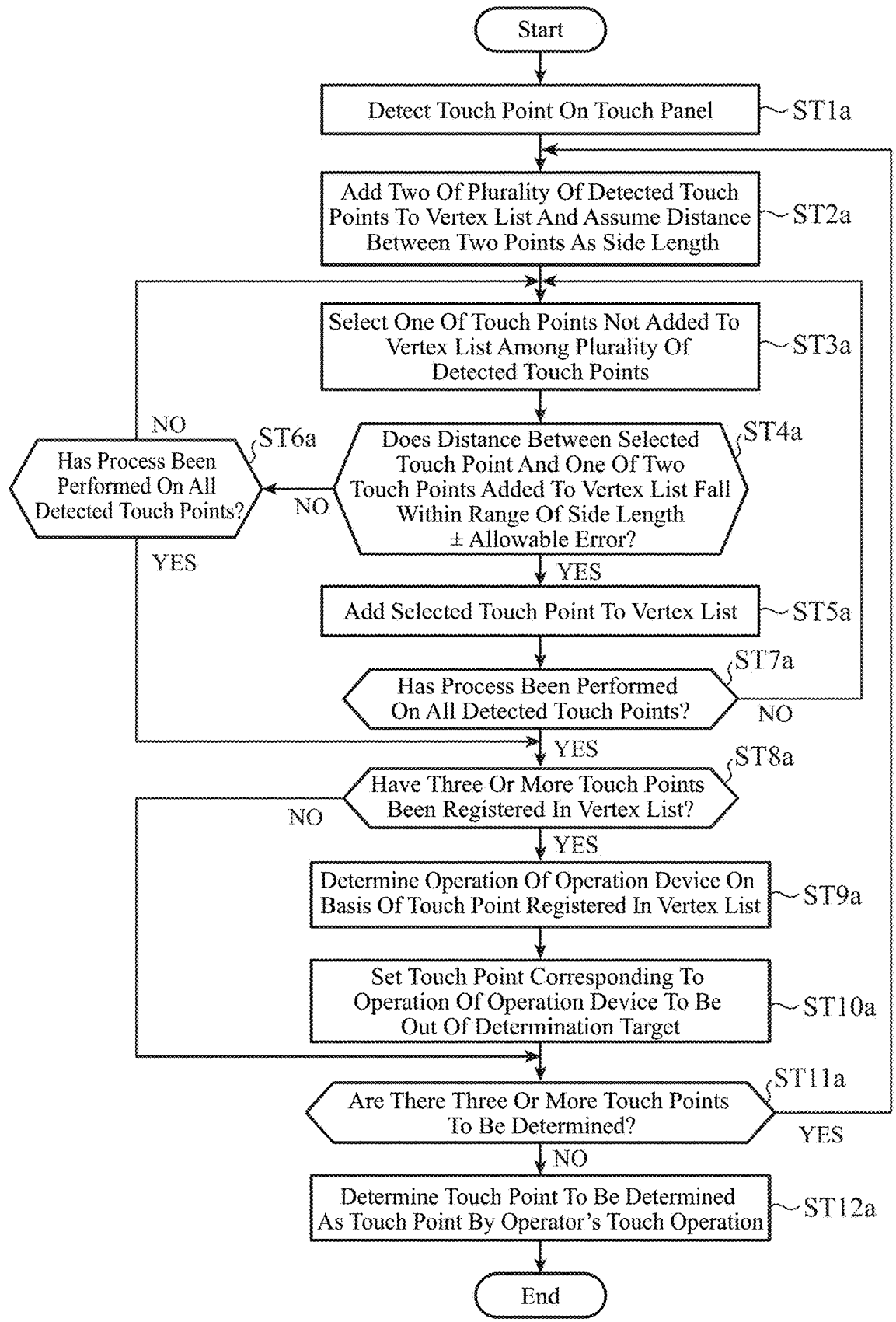
FIG. 5 is a flowchart showing a specific example of the operation determination method according to the first embodiment.

FIG. 5 is a flowchart showing a specific example of the operation determination method according to the first embodiment.

In FIG. 5, the process of step ST1*a* corresponds to the process of step ST1 of FIG. 4. The processing from step ST2*a* to step ST12*a* corresponds to the detailed process of step ST2 in FIG. 4.

Figure 6:
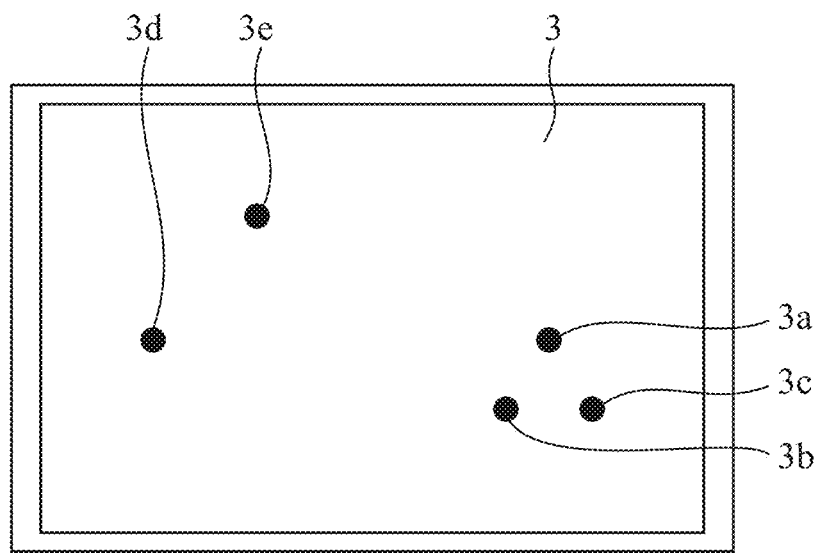
FIG. 6 is a diagram showing an example of a plurality of touch points on a touch panel.

First, the touch point detecting unit 40 detects a touch point on the touch panel 3 (step ST1*a*). For example, the touch point detecting unit 40 outputs touch information regarding the detected touch point to the operation determination unit 41. FIG. 6 is a diagram showing touch points 3*a* to 3*e* on the touch panel 3. The touch point detecting unit 40 detects portions where the change in electrostatic capacitance is detected by the touch panel 3 as the touch points 3*a* to 3*e*, and outputs touch information regarding the touch points 3*a* to 3*e* to the operation determination unit 41.

The operation determination unit 41 adds two of the touch points 3*a* to 3*e* to the vertex list on the basis of the touch information input from the touch point detecting unit 40, and assumes the distance between the two points as the side length (step ST2*a*). The vertex list is information for registering touch points as vertices.

Figure 7:
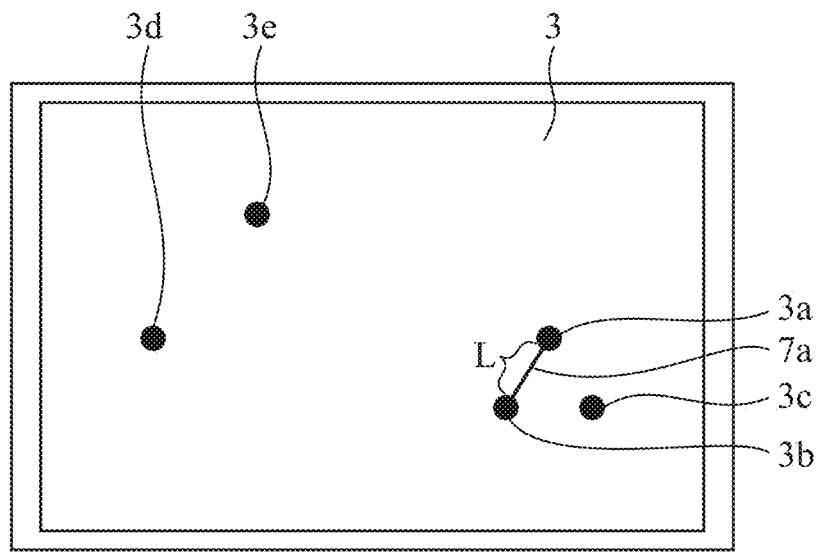
FIG. 7 is a diagram showing an outline of process for adding two touch points to a vertex list.

FIG. 7 is a diagram showing an outline of process for adding two touch points to the vertex list. For example, the operation determination unit 41 specifies the position coordinates of the touch points 3*a* to 3*e* on the basis of the touch information regarding the touch points 3*a* to 3*e*, and adds the touch point 3*a* and the touch point 3*b* to the vertex list.

At this time, the operation determination unit 41 sets the line segment connecting the touch point 3*a* and the touch point 3*b* as a side 7*a*, and stores a length L of the side 7*a*. For example, information indicating the length L of the side 7*a* is stored in a memory (not illustrated) included in the processing circuit 103 shown in FIG. 2A or stored in the memory 105 shown in FIG. 2B.

Figure 8:
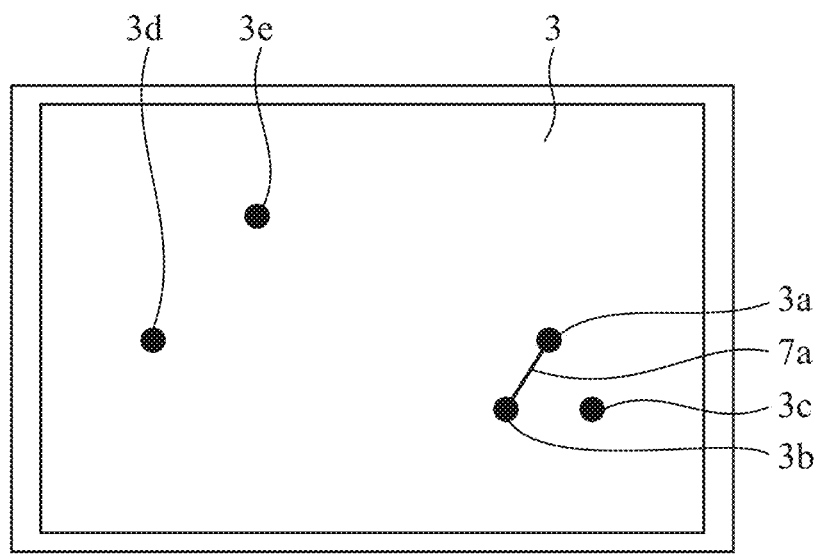
FIG. 8 is a diagram showing touch points added to the vertex list and remaining touch points detected on the touch panel.

The operation determination unit 41 selects one touch point from the touch points that have not been added to the vertex list among the plurality of touch points detected by the touch point detecting unit 40 in step ST1*a* (step ST3*a*). FIG. 8 is a diagram showing the touch points 3*a* and 3*b* added to the vertex list and the touch points 3*c* to 3*d* not added to the vertex list. The operation determination unit 41 selects one touch point from the touch points 3*c* to 3*e* not added to the vertex list among the touch points 3*a* to 3*e* detected by the touch point detecting unit 40.

Next, the operation determination unit 41 determines whether or not the distance between the touch point selected in step ST3*a* and the touch point registered in the vertex list falls within the range of ±allowable errors of the side length (step ST4*a*).

Here, the retrieval criterion is that the shape (reference shape) with three or more conductor columnar supports provided in the operation device 2 as vertices is a regular polygon, all the conductor columnar supports provided in one operation device 2 are arranged at equal intervals, and three or more conductor columnar supports are located in a region range corresponding to the bottom surface part 22.

Accordingly, in step ST4*a*, a pair of touch points in which the distance between the touch points is within the allowable range of the distance between the conductor columnar supports that the operation device 2 can take is retrieved from the shape with the touch points as vertices. Note that, the retrieval criterion is an example, and other conditions may be used as long as the criterion matches the reference shape of the operation device 2.

Figure 9:
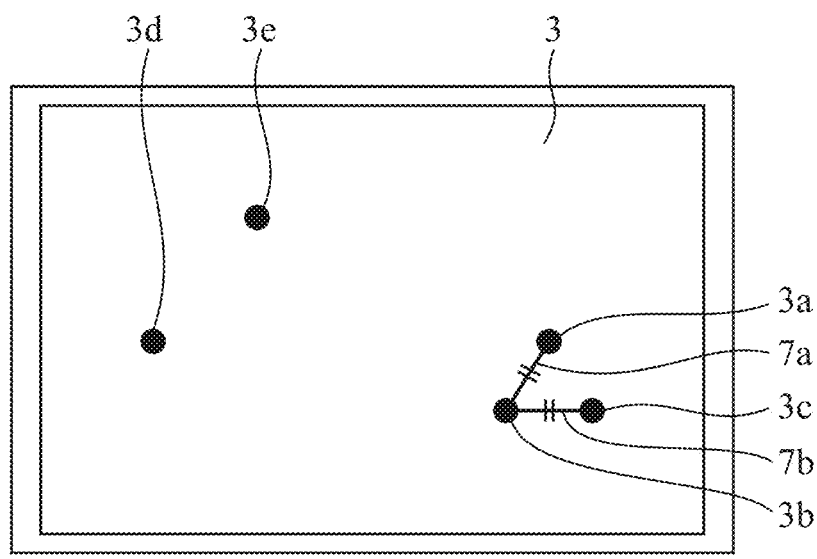
FIG. 9 is a diagram showing a case where the distance between touch points is within a range allowed as a side length of a reference shape.

FIG. 9 is a diagram illustrating a case where the distance between touch points is within a range allowed as the side length of the reference shape, and illustrates a case where the operation determination unit 41 selects the touch point 3*c* in step ST3*a*. At this time, the operation determination unit 41 determines that the length of a side 7*b* connecting the touch point 3*b* and the touch point 3*c* is within the range of ±allowable error of the length L of the side 7*a* (YES in step ST4*a*). That is, since the length of the side 7*b* connecting the touch point 3*b* and the touch point 3*c* is within the allowable range as the side length of the reference shape, the operation determination unit 41 adds the touch point 3*c* to the vertex list (step ST5*a*).

Figure 10:
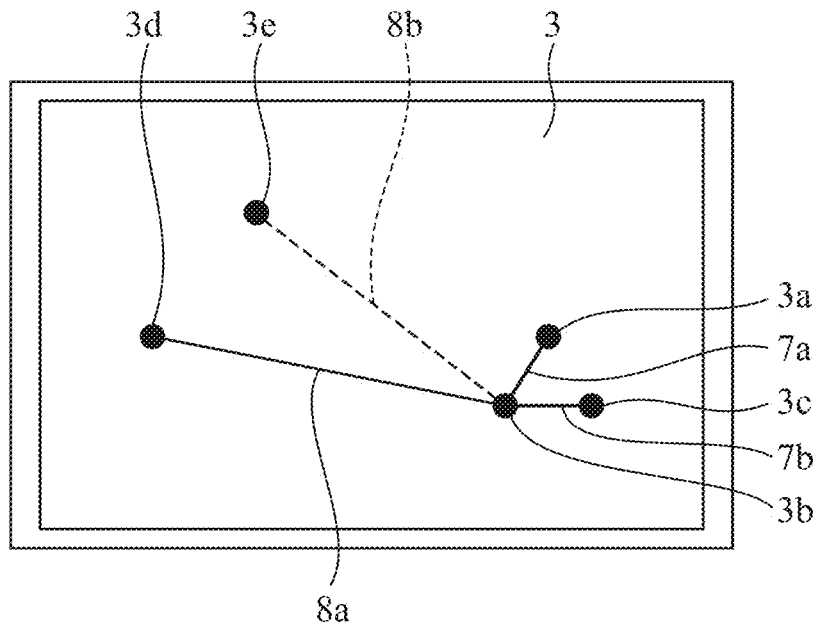
FIG. 10 is a diagram showing a case where the distance between touch points is outside the range allowed as the side length of the reference shape.

FIG. 10 is a diagram illustrating a case where the distance between touch points is outside the range allowed as the side length of the reference shape, and the touch points 3*d* and 3*e* are selected in step ST3*a*.

The operation determination unit 41, when the touch point 3*d* is selected in step ST3*a*, determines that the length of a side 8*a* connecting the touch point 3*b* and the touch point 3*d* is outside the range of ±allowable error of the length L of the side 7*a* (NO in Step ST4*a*). That is, since the length of the side 8*a* connecting the touch point 3*d* and the touch point 3*c* is outside the range allowed as the side length of the reference shape, the operation determination unit 41 does not add the touch point 3*d* to the vertex list and proceeds to a process of step ST6*a*.

In step ST6*a*, the operation determination unit 41 determines whether or not the above-described series of processing has been performed on all touch points detected in step ST1*a*. At this time, since the touch point 3*e* is not selected (NO in step ST6*a*), the operation determination unit 41 returns to the process of step ST3*a* and selects the touch point 3*e*.

In step ST4*a*, the operation determination unit 41 determines that the length of a side 8*b* connecting the touch point 3*b* and the touch point 3*e* is outside the range of ±allowable error of the length L of the side 7*a*. The operation determination unit 41 does not add the touch point 3*e* to the vertex list and proceeds to the process of step ST6*a*.

At this time, since the operation determination unit 41 has performed the above-described series of processing on all touch points detected in step ST1*a* (YES in step ST6*a*), it proceeds to the process of step ST8*a*.

When the process of step ST5*a* is completed, the operation determination unit 41 determines whether or not the series of processing described above has been performed on all touch points detected in step ST1*a* (step ST7*a*). When there is an unprocessed touch point (NO in step ST7*a*), the operation determination unit 41 returns to the process of step ST3*a* and selects the unprocessed touch point, thereby repeating the series of processing described above.

When there is no unprocessed touch point (YES in step ST7*a*), the operation determination unit 41 checks whether or not three or more touch points are registered in the vertex list (step ST8*a*). When three or more touch points are not registered in the vertex list (NO in step ST8*a*), the operation determination unit 41 proceeds to the process of step ST11*a*.

Figure 11:
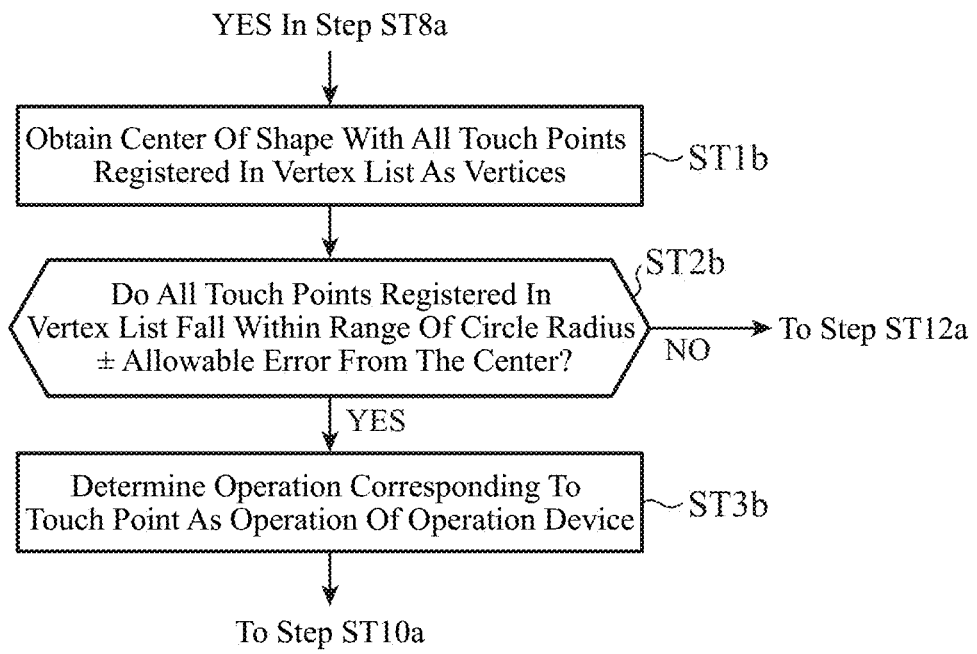
FIG. 11 is a flowchart showing details of a process in step ST9a of FIG. 5.

If three or more touch points are registered in the vertex list (YES in step ST8*a*), the operation determination unit 41 determines the operation of the operation device 2 on the basis of the three or more touch points registered in the vertex list (step ST9*a*). FIG. 11 is a flowchart showing details of the process in step ST9*a*. First, the operation determination unit 41 obtains the center of the shape with all the touch points registered in the vertex list as vertices (step ST1b).

Figure 12:
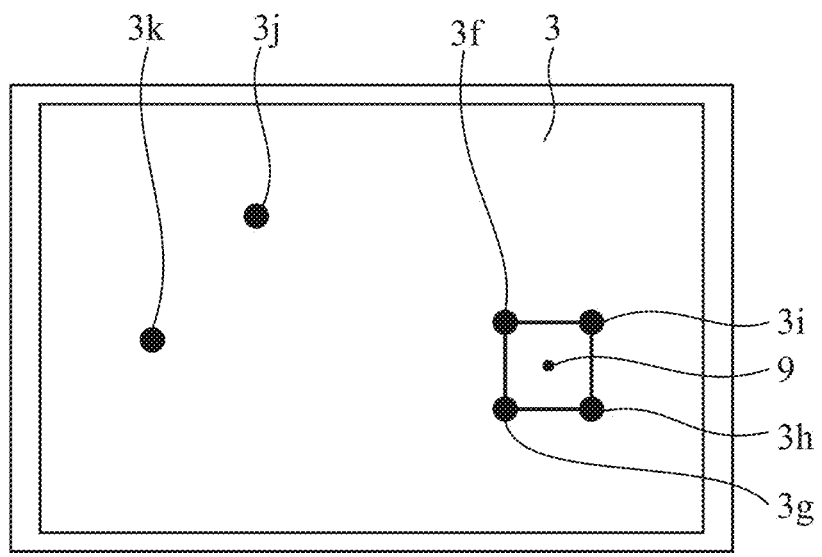
FIG. 12 is a diagram showing a shape and a center with touch points as vertices and remaining touch points on the touch panel.

FIG. 12 is a diagram showing the shape with touch points 3f to 3i as vertices and a center 9, and remaining touch points 3j and 3k on the touch panel 3. In the example of FIG. 12, the touch points 3f to 3i are registered in the vertex list, and the operation determination unit 41 obtains the center 9 of the shape (square) with each of the touch points 3f to 3i as a vertex. The touch point 3j and the touch point 3k are touch points that have not been added to the vertex list by the series of processing described above.

Next, the operation determination unit 41 determines whether or not all touch points registered in the vertex list fall within the range of ±allowable error of circle radius from the center (step ST2b).

As described above, here, the retrieval criterion is that the shape (reference shape) with three or more conductor columnar supports provided in the operation device 2 as vertices is a regular polygon, all the conductor columnar supports provided in one operation device 2 are arranged at equal intervals, and three or more conductor columnar supports are located in a region range corresponding to the bottom surface part 22.

Therefore, in step ST2b, three or more touch points in the allowable range (region range corresponding to the bottom surface part 22) of the positional relationship of the conductor columnar supports that the operation device 2 can take are retrieved.

Figure 13:
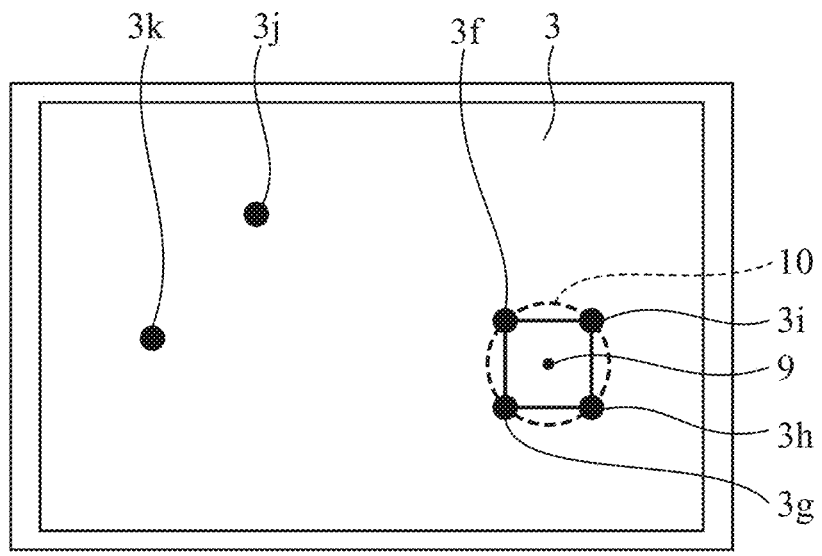
FIG. 13 is a diagram showing a case where a positional relationship of all touch points registered in the vertex list satisfies a condition of the reference shape.

FIG. 13 is a diagram illustrating a case where the positional relationship between all the touch points 3f to 3i registered in the vertex list satisfies the condition of the reference shape.

In the example shown in FIG. 13, the operation determination unit 41 determines that the touch points 3f to 3i registered in the vertex list fall within the range of ±allowable error of the radius of a circle 10 from the center 9 (YES in step ST2b). At this time, the operation determination unit 41 determines that the operation corresponding to the touch points 3f to 3i registered in the vertex list is the operation of the operation device 2 (step ST3b).

Figure 14:
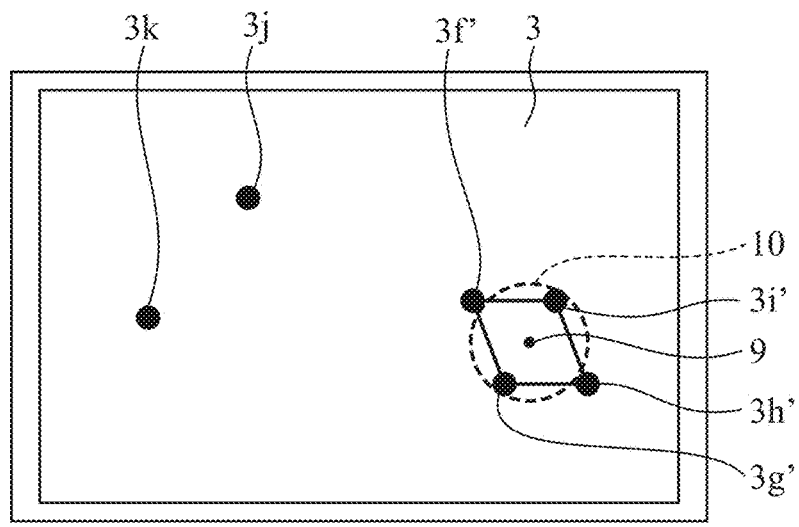
FIG. 14 is a diagram showing a case where a positional relationship of some touch points registered in the vertex list does not satisfy the reference shape condition.

FIG. 14 is a diagram illustrating a case where the positional relationship between some touch points registered in the vertex list does not satisfy the condition of the reference shape. In the example of FIG. 14, the operation determination unit 41 determines that a touch point 3f and a touch point 3h' of touch points 3f to 3i' registered in the vertex list do not fall within the range of ±allowable error of the radius of the circle 10 from the center 9 (NO in step ST2b). At this time, the operation determination unit 41 determines that the touch point 3f and the touch point 3h' that do not depend on the operation device 2 are registered in the vertex list, proceeds to step ST12a in FIG. 5, and determines the operation corresponding to the touch point 3f and the touch point 3h' as the operator's touch operation.

In step ST10a of FIG. 5, the operation determination unit 41 sets the touch point corresponding to the operation of the operation device 2 to be outside the determination target.

Figure 15:
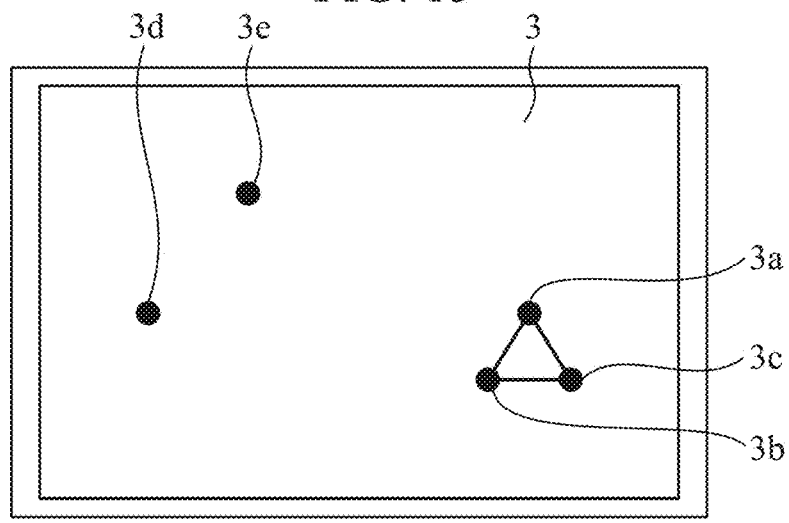
FIG. 15 is a diagram showing touch points determined to correspond to an operation of the operation device and remaining touch points on the touch panel.

FIG. 15 is a diagram showing the touch points 3a to 3c determined to correspond to the operation of the operation device 2, and the remaining touch points 3d and 3e on the touch panel 3. In the example illustrated in FIG. 15, the operation determination unit 41 excludes the touch points 3a to 3c determined to correspond to the operation of the operation device 2 from the determination targets, and sets the touch points 3d and 3e as determination targets.

For example, the operation determination unit 41 associates flag information indicating that a touch point is not a determination target or flag information indicating that it is a determination target with an identification number of the touch point included in the touch information.

When the process of step ST10a is completed, or when there are two or less touch points registered in the vertex list, the operation determination unit 41 checks whether or not there are three or more touch points to be determined (step ST11a).

Figure 16:
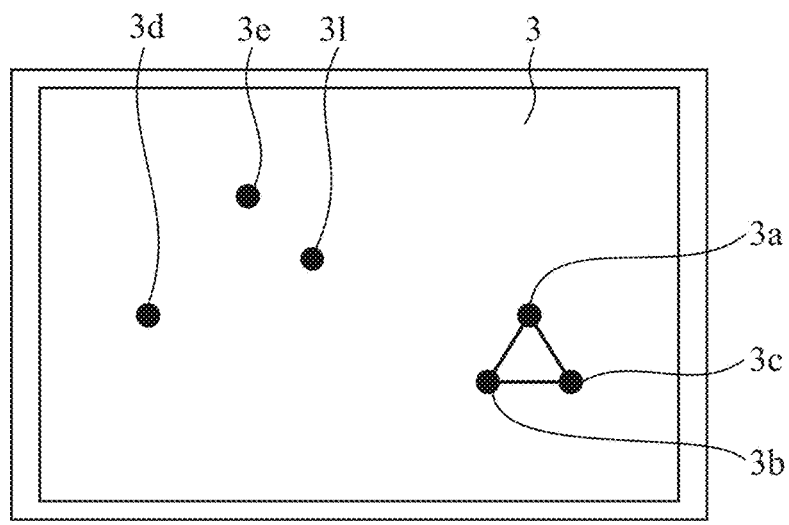
FIG. 16 is a diagram showing a case where there are three touch points to be determined.

FIG. 16 is a diagram illustrating a case where there are three touch points to be determined. As shown in FIG. 16, when the remaining touch points excluding the touch points 3a to 3c corresponding to the operation of the operation device 2 are the three touch points 3d, 3e, and 3l (YES in step ST11a), the touch points 3d, 3e, and 3l may correspond to the operation of the operation device 2 different from the operations of the operation device 2 corresponding to the touch points 3a to 3c.

The operation determination unit 41 returns to the process of step ST2a, and performs a series of processing from step ST2a on the touch points 3d, 3e, and 3l to be determined.

FIG. 17 is a diagram illustrating a case where there are only two touch points to be determined. As shown in FIG. 17, when the remaining touch points excluding the touch points 3a to 3c determined to correspond to the operation of the operation device 2 are the two touch points 3d and 3l (NO in step ST11a), there are two or less touch points to be determined, and a shape (regular polygon) with these touch points as vertices cannot be formed. At this time, the operation determination unit 41 determines that the touch points 3d and 3l are touch points that do not depend on the operation device 2, and determines the operation corresponding to the touch points 3d and 3l as the operator's touch operation (step ST12a).

In FIG. 5, the operation by the operation device 2 is determined using the allowable range of the distance and the positional relationship between the conductor columnar supports that the operation device 2 can take, but may be determined using unique information for each operation device 2.

For example, the unique information of the operation device 2 arranged on the touch panel 3 is registered in the operation determination unit 41. The unique information of the operation device 2 is information including the number of conductor columnar supports (reference shape) and the allowable range of the distance between the conductor columnar supports. The operation determination unit 41 determines the operation of the operation device 2 by directly comparing the shape with the touch points as vertices with the unique information of the operation device 2. In this case, as shown in FIG. 5, it is not necessary to retrieve a shape within the allowable range for each touch point, and the processing amount required for determining the operation can be greatly reduced.

Further, a priority order may be given to each shape (reference shape) with the conductor columnar supports of the operation device 2 as vertices. FIG. 18 is a diagram illustrating the relationship between the reference shape of the operation device 2 and the priority order. For example, when the operation device 2 whose reference shape is an equilateral triangle is most frequently used, the priority order "1" is assigned to the equilateral triangle as shown in FIG. 18. In the operation determination unit 41, the allowable range of the distance and the positional relationship between the conductor columnar supports are set in advance for each reference shape. The operation determination unit 41 selects an allowable range on the basis of the priority order assigned to the reference shape, and retrieves a shape in the selected allowable range from among shapes with the touch points as vertices. In this case, since the retrieval is started from the one having the highest priority order, that is, the one that matches the most used reference shape, the efficiency of the retrieving process of the shape corresponding to the operation device 2 can be improved.

Between the conductor columnar support of the operation device 2 and the operator's finger, the electrostatic capacitance detected at the touch point and the contact state of the touched object at the touch point are greatly different.

For example, the detected value of the electrostatic capacitance, the contact area, and the depressing pressure at the touch point are often larger for the operator's finger than the conductor columnar support of the operation device. The touch point detecting unit 40 outputs at least one of the detected value of the electrostatic capacitance, the contact area, and the depressing pressure at the touch point to the operation determination unit 41 as touch information. The operation determination unit 41 determines a touch point where the detected value of the electrostatic capacitance, the contact area, and the depressing pressure at the touch point are smaller than the thresholds as the touch point by the conductor columnar support of the operation device 2, and a touch point equal to or higher than the thresholds is determined as the touch point by the operator's finger. Then, the operation determination unit 41 determines the operation of the operation device 2 using the touch point by the conductor columnar support, and determines the touch operation using the touch point by the finger. This makes it possible to reduce the processing amount required for determining the operation.

As described above, the operation input device 4 according to the first embodiment determines the operation of one or a plurality of operation devices 2 on the basis of the distance between two touch points and the positional relationship of three or more touch points, and determines the operation corresponding to the touch point not depending on the operation device 2 as the touch operation. This can increase types of operations that can be received.

For example, in the operation input device 4, as the type of operation corresponding to a plurality of touch points, it is possible to determine one of an operator's touch operation, an operation of one operation device 2, an operation obtained by combining operations of a plurality of operation devices 2, and an operation obtained by combining an operator's touch operation and an operation of one or a plurality of operation devices 2.

In the operation input device 4 according to the first embodiment, the touch point detecting unit 40 detects each of a plurality of conductor columnar supports provided in the operation device 2 as a touch point. The operation determination unit 41 retrieves a shape in which the distance and the positional relationship between the touch points are within the allowable range of the distance and the positional relationship between the conductor columnar supports that the operation device 2 can take from among shapes with touch points as vertices, and determines the operation corresponding to the touch point as the vertex of the retrieved shape as the operation of the operation device 2.

With this configuration, it is possible to accurately determine a touch point that corresponds to the operation of the operation device 2 among a plurality of touch points detected by the touch point detecting unit 40.

Further, by using the allowable range of the distance between the conductor columnar supports and the positional relationship of three or more conductor columnar supports that the operation device 2 can take as a retrieval criterion for a touch point corresponding to the operation of the operation device 2, it is possible to retrieve a touch point corresponding to the operation of the operation device 2, even if the exact distance between the conductor columnar supports or the number of conductor columnar supports in the operation device 2 is unknown.

In the operation input device 4 according to the first embodiment, the operation determination unit 41 determines whether the touch point is a touch point by the operation device 2 or a touch point by a touch operation on the basis of at least one of the electrostatic capacitance detected at the touch point, the contact state of the touched object at the touch point, and the change in the position coordinates of the touch point. With this configuration, the processing amount required for determining the operation can be reduced.

In the operation input device 4 according to the first embodiment, the operation determination unit 41 retrieves a shape that is within an allowable range selected on the basis of the priority order given to a shape with the conductor columnar supports of the operation device 2 as vertices from among shapes with the touch points as vertices. This makes it possible to improve the efficiency of the retrieving process for the shape corresponding to the operation device 2.

The information processing system 1 according to the first embodiment includes the operation device 2, the touch panel 3, the operation input device 4, the process determination unit 5, and the process execution unit 6. With such a configuration, it is possible to implement an information processing system that can obtain the above effects.

Second Embodiment

FIG. 19 is a block diagram showing a configuration of an operation input device 4A according to a second embodiment of the present invention. As in the first embodiment, the operation input device 4A is an operation input device included in the information processing system 1 illustrated in FIG. 1, detects a touch point corresponding to an operation received by the touch panel 3, and determines a type of operation corresponding to the detected touch point.

For example, the operation input device 4A determines whether the type of operation corresponding to the touch point on the touch panel 3 is an operator's touch operation, an operation of one operation device 2, an operation obtained by combining operations of a plurality of operation devices 2, or an operation obtained by combining an operator's touch operation and an operation of one or a plurality of operation devices 2.

The process corresponding to the operation determined by the operation input device 4A is determined by the process determination unit 5 shown in FIG. 1. Further, the process execution unit 6 executes the process determined by the process determination unit 5. Note that, although FIG. 19 illustrates a configuration in which the operation input device 4A does not include the process determination unit 5 and the process execution unit 6, each of the process determination unit 5 and the process execution unit 6 may be a constituent element included in the operation input device 4A.

The operation input device 4A includes a touch point detecting unit 40A and an operation determination unit 41A. The touch point detecting unit 40A detects a touch point on the touch panel 3. The operation determination unit 41A determines an operation of one or a plurality of operation devices 2 arranged on the touch panel 3 on the basis of the distance and the positional relationship between touch points at a plurality of touch points detected by the touch point detecting unit 40A. Further, the operation determination unit 41A determines an operation corresponding to a touch point that does not depend on the operation device 2 as a touch operation on the touch panel 3.

As described in the first embodiment, an operable process for each reference shape is set to the operation device 2, and operations corresponding to the same or similar shapes correspond to the same processing. For this reason, if operations corresponding to the same or similar shapes are executed simultaneously, the same process is required to be executed redundantly, which may cause a malfunction.

Therefore, in the operation determination unit 41A in the second embodiment, when the same or similar shapes included in the allowable range of the distance and the positional relationship between the conductor columnar supports that the operation device 2 can take are retrieved from among the shapes with the touch points as vertices, a retrieving process of the shape is repeated until a difference is recognized between the shapes.

The same or similar shapes mean that the shapes on the touch panel 3 are different in position, but the shapes themselves are the same or similar. As a case where a difference between shapes is recognized, there is a case where there is a change in the shape itself (a case where the shape itself with the touch points as vertices changes so that they are not the same or similar shapes).

The functions of the touch point detecting unit 40A and the operation determination unit 41A are implemented by a processing circuit. That is, the operation input device 4A includes a processing circuit for executing the process shown in FIGS. 4 and 20. The processing circuit may be the processing circuit 103 of the dedicated hardware shown in FIG. 2A or the processor 104 that executes a program stored in the memory 105 shown in FIG. 2B.

The operation will be described next.

Figure 20:
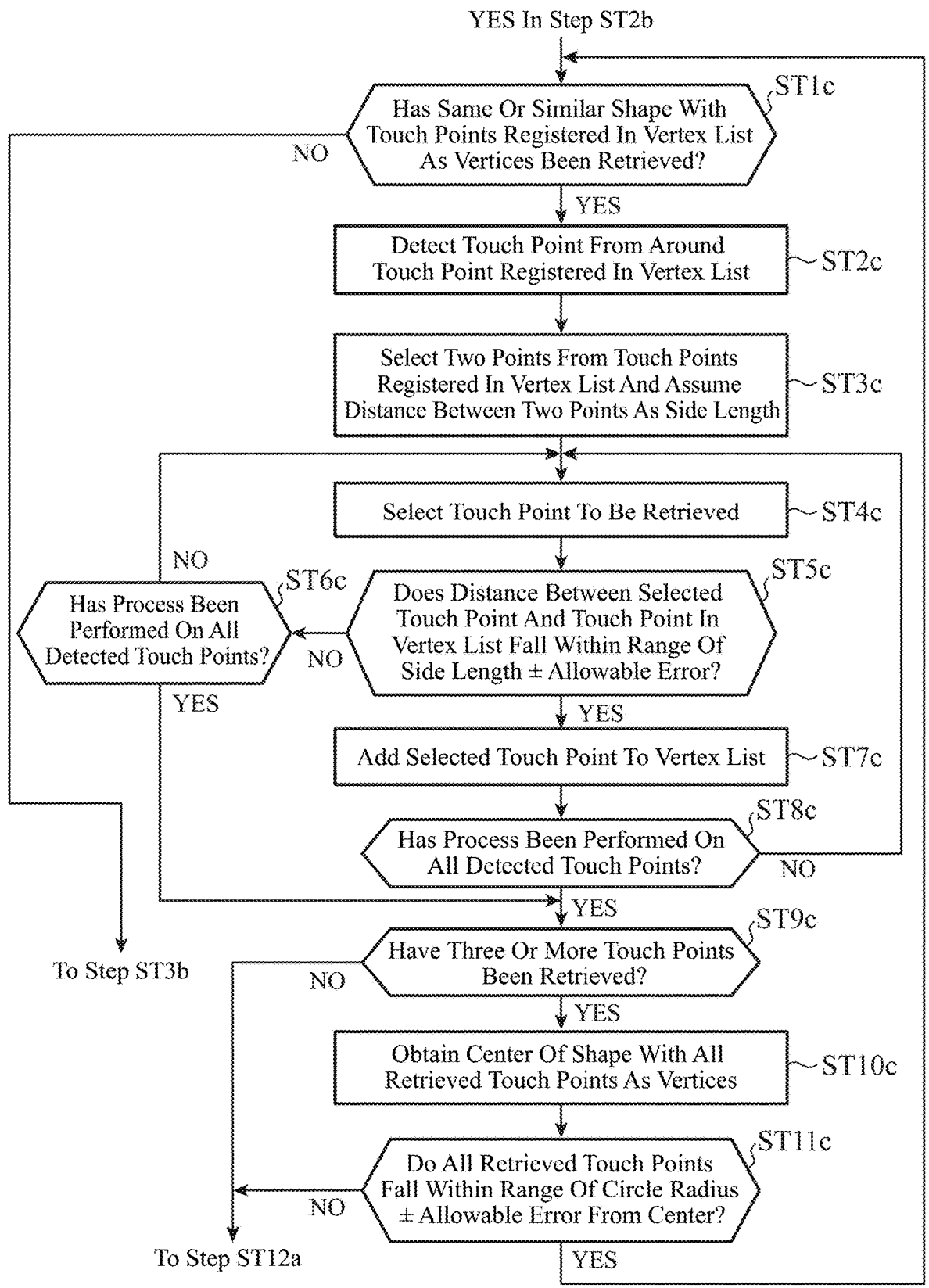
FIG. 20 is a flowchart showing an operation determination method according to the second embodiment.

FIG. 20 is a flowchart showing the operation determination method according to the second embodiment, and shows a series of processing inserted between step ST2b and step ST3b in FIG. 11.

When all the touch points registered in the vertex list fall within the range of ±allowable error of circle radius from the center (YES in step ST2b), the operation determination unit 41A determines whether or not the same or similar shapes with the touch points registered in the vertex list as vertices have been retrieved (step ST1c).

When the retrieved shapes are not the same or similar (NO in step ST1c), the operation determination unit 41A proceeds to step ST3b and determines an operation corresponding to the touch point registered in the vertex list as the operation of the operation device 2.

On the other hand, when the same or similar shapes have been retrieved (YES in step ST1c), the operation determination unit 41A instructs the touch point detecting unit 40A to detect touch points from around all touch points as vertices of one of the same or similar shapes. The touch point detecting unit 40A detects touch points from around the touch points as vertices in accordance with the instruction of the operation determination unit 41A (step ST2c).

The operation determination unit 41A selects two from the touch points registered in the vertex list, and assumes the distance between the two points as a side length (step ST3c).

For example, when two or more touch points are detected in step ST2c, the operation determination unit 41A selects two of these touch points and adds them to the vertex list, and assumes the distance between the two added points as a side length.

When the touch point is not detected in step ST2c or there is one detected touch point, the operation determination unit 41A assumes the distance between the two points selected from the touch points registered in the vertex list as a side length.

Subsequently, the operation determination unit 41A selects a touch point to be retrieved (step ST4c).

For example, when three or more touch points are detected in step ST2c, the operation determination unit 41A selects one touch point from touch points that have not been added to the vertex list.

When two or less touch points are detected in step ST2c, the operation determination unit 41A selects touch points around one of the two touch points selected in step ST3c among the touch points registered in the vertex list.

The operation determination unit 41A determines whether or not the distance between the touch point selected in step ST4c and the touch point selected from the vertex list falls within the range of ±allowable error of the above-mentioned side length (step ST5c). Here, when the distance between the two does not fall within the range of ±allowable error of the side length (NO in step ST5c), the operation determination unit 41A proceeds to the process of step ST6c.

In step ST6c, the operation determination unit 41A determines whether or not the series of processing described above has been performed on all the touch points detected in step ST2c.

When the above-described series of processing has not been performed on all the touch points detected in step ST2c (NO in step ST6c), the operation determination unit 41A returns to the process of step ST4c and performs a series of processing on other touch points detected in step ST2c.

If the above-described series of processing has been performed on all the touch points detected in step ST2c (YES in step ST6c), the operation determination unit 41A proceeds to a process of step ST9c.

When the distance between the touch point selected in step ST4c and the touch point selected from the vertex list falls within the range of ±allowable error of the above-mentioned side length (YES in step ST5c), the operation determination unit 41A adds the touch point selected in step ST4c to the vertex list (step ST7c). Note that, even when the touch point registered in the vertex list is selected in step ST4c, the touch point is treated as the one newly added to the vertex list.

Thereby, a pair of touch points in which the distance between the touch points is within the allowable range of the distance between the conductor columnar supports that the operation device 2 can take is re-searched.

When the process of step ST7c is completed, the operation determination unit 41A determines whether or not the series of processing described above has been performed on all touch points detected in step ST2c (step ST8c). Here, when there is an unprocessed touch point (NO in step ST8c), the operation determination unit 41A returns to the process of step ST4c, and performs the above-described series of processing on the other touch points detected in step ST2c.

On the other hand, when there is no unprocessed touch point (YES in step ST8c), the operation determination unit 41A checks whether or not three or more touch points have been retrieved in step ST7c (step ST9c). When two or less touch points have been retrieved in step ST7c (NO in step ST9c), the operation determination unit 41A proceeds to a process of step ST12*a* in FIG. 5 and determines an operation corresponding to the touch point in the vertex list as the operator's touch operation.

On the other hand, when three or more touch points have been retrieved in step ST7*c* (YES in step ST9*c*), the operation determination unit 41A obtains the center of the shape with all the retrieved touch points as vertices (step ST10*c*).

Next, the operation determination unit 41A determines whether or not all the retrieved touch points fall within the range of ±allowable error of the circle radius from the center (step ST11*c*).

As a result, three or more touch points in the allowable range (region range corresponding to the bottom surface part 22) of the positional relationship of the conductor columnar supports that the operation device 2 can take are retrieved.

When all or part of the retrieved touch points do not fall within the range of ±allowable error of the circle radius from the center (NO in step ST11*c*), the operation determination unit 41A proceeds to step ST12*a* in FIG. 5 and determines the operation corresponding to the touch point registered in the vertex list as the operator's touch operation.

When all the retrieved touch points fall within the range of ±allowable error of the circle radius from the center (YES in step ST11*c*), the operation determination unit 41A returns to the process of step ST1*c*, and determines whether or not the shape with the touch points registered in the vertex list before the retrieval is performed again as vertices and the shape with the retrieved touch points as vertices are the same or similar.

Accordingly, the series of processing shown in FIG. 20 is repeated until a difference is recognized between the two shapes. If there is a change in the shape itself, the process proceeds to the process of step ST3*b*.

Thus, in the second embodiment, when the same or similar shapes are retrieved, it is not recognized as an operation of the operation device 2 until a difference is recognized in these shapes. This can reduce the malfunction mentioned above.

Figure 21:
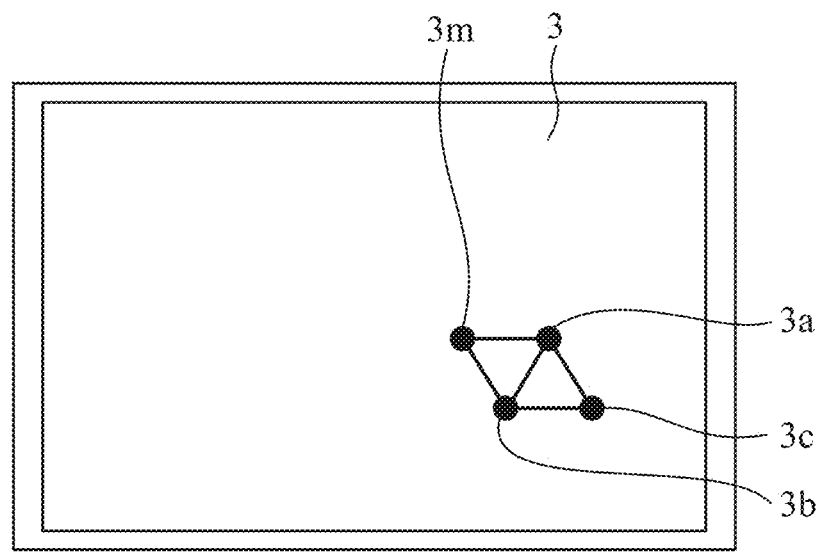
FIG. 21 is a diagram showing a case where one of the same or similar shapes with touch points as vertices includes a touch point by a touch operation.

FIG. 21 is a diagram illustrating a case where one of the same or similar shapes with touch points as vertices includes a touch point by a touch operation. In FIG. 21, the operator's finger having touched the touch panel 3 is detected as a touch point 3*m* by the touch point detecting unit 40A. Touch points 3*a* to 3*c* and 3*m* are registered in the vertex list, and an equilateral triangle with the touch points 3*a* to 3*c* as vertices and an equilateral triangle with the touch points 3*a*, 3*b* and 3*m* as vertices are retrieved.

In the situation shown in FIG. 21, the operation determination unit 41A executes a series of processing shown in FIG. 20. If the operator detaches his/her finger from the touch panel 3 while the process shown in FIG. 20 is repeated, the touch point 3*m* is not detected, and the equilateral triangle with the touch points 3*a*, 3*b* and 3*m* as vertices will not be retrieved accordingly. Thereby, the operation determination unit 41A determines only the operation corresponding to the touch points 3*a* to 3*c* as the operation of the operation device 2.

As described above, in the second embodiment, it is possible to prevent malfunction due to the operator having touched the touch panel 3 by mistake.

Further, the operation determination unit 41A does not need to retrieve the same or similar shapes.

For example, the operation determination unit 41A, when having retrieved an equilateral triangle with the touch points as vertices, excludes the equilateral triangle from the subsequent shapes to be retrieved, and does not retrieve the equilateral triangle with the touch points as vertices. As a result, malfunctions due to redundant operations can be reduced, and it is not necessary to repeat the series of processing shown in FIG. 20 until a difference in shape is recognized, so that the processing amount can be reduced.

Note that, the operation determination unit 41A may determine the operation of the operation devices 2 having the same reference shape. For example, an operable process for the operation device 2 is not set for each reference shape, but is set depending on the position of the operation device 2 on the touch panel 3. Even when the shape with the touch points as vertices is the same or similar, if the position of the shape matches the position of the operation device 2, the operation determination unit 41A determines the operation corresponding to the touch point of the shape as the operation of the operation device 2. In this way, it is possible to determine the operations of a plurality of operation devices 2 having the same reference shape.

As described above, in the operation input device 4A according to the second embodiment, the operation determination unit 41A, when a plurality of the same or similar shapes has been retrieved, repeats the retrieving process of the shape until a difference is recognized between the same or similar shapes. By repeating the shape retrieval until the shapes are no longer the same or similar, it is possible to reduce malfunctions caused by redundant operations using the operation device 2.

In the operation input device 4A according to the second embodiment, the operation determination unit 41A does not need to retrieve the same or similar shapes. This makes it possible to reduce malfunctions while reducing the processing amount.

Third Embodiment

Figure 22:
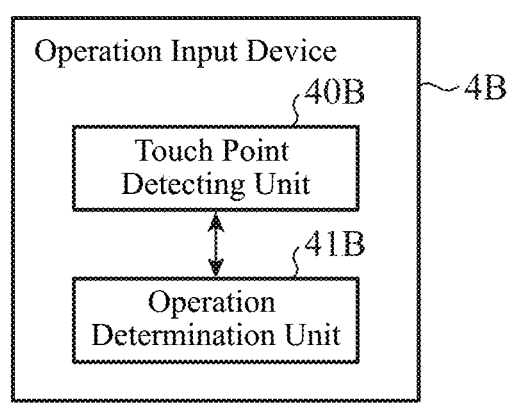
FIG. 22 is a block diagram showing a configuration of an operation input device according to a third embodiment of the present invention.

FIG. 22 is a block diagram showing a configuration of an operation input device 4B according to a third embodiment of the present invention. As in the first embodiment, the operation input device 4B is an operation input device included in the information processing system 1 illustrated in FIG. 1, detects a touch point corresponding to an operation received by the touch panel 3, and determines a type of the operation corresponding to the detected touch point.

For example, the operation input device 4B determines whether the type of operation corresponding to the touch point on the touch panel 3 is an operator's touch operation, an operation of one operation device 2, an operation obtained by combining operations of a plurality of operation devices 2, or an operation obtained by combining an operator's touch operation and an operation of one or a plurality of operation devices 2.

The process corresponding to the operation determined by the operation input device 4B is determined by the process determination unit 5 shown in FIG. 1. Further, the process execution unit 6 executes the process determined by the process determination unit 5. Although FIG. 22 illustrates a configuration in which the operation input device 4B does not include the process determination unit 5 and the process execution unit 6, each of the process determination unit 5 and the process execution unit 6 may be a constituent element included in the operation input device 4B.

The operation input device 4B includes a touch point detecting unit 40B and an operation determination unit 41B. The touch point detecting unit 40B detects a touch point on the touch panel 3. The operation determination unit 41B determines the operation of one or a plurality of operation devices 2 arranged on the touch panel 3 on the basis of the distance and the positional relationship between the touch points at the plurality of touch points detected by the touch point detecting unit 40B. In addition, the operation determination unit 41B determines an operation corresponding to a touch point that does not depend on the operation device 2 as a touch operation on the touch panel 3.

When a plurality of touch points is detected around the previously retrieved shape, the operation determination unit 41B determines an operation corresponding to the detected touch point as the operation of the operation device 2 corresponding to the previously retrieved shape. For example, when a plurality of touch points is detected around the shape with touch points registered in the vertex list as vertices, the operation determination unit 41B checks whether or not the number of detected touch points is the same as the number of touch points that form the shape registered in the vertex list. At this time, if the number of detected touch points is the same as the number of touch points that form the shape registered in the vertex list, the operation determination unit 41B determines that an operation of the operation device 2 corresponding to the touch point registered in the vertex list has been made.

The functions of the touch point detecting unit 40B and the operation determination unit 41B are implemented by a processing circuit. That is, the operation input device 4B includes a processing circuit for executing the processing shown in FIGS. 4 and 23. The processing circuit may be the processing circuit 103 of the dedicated hardware shown in FIG. 2A or the processor 104 that executes a program stored in the memory 105 shown in FIG. 2B.

The operation will be described next.

Figure 23:
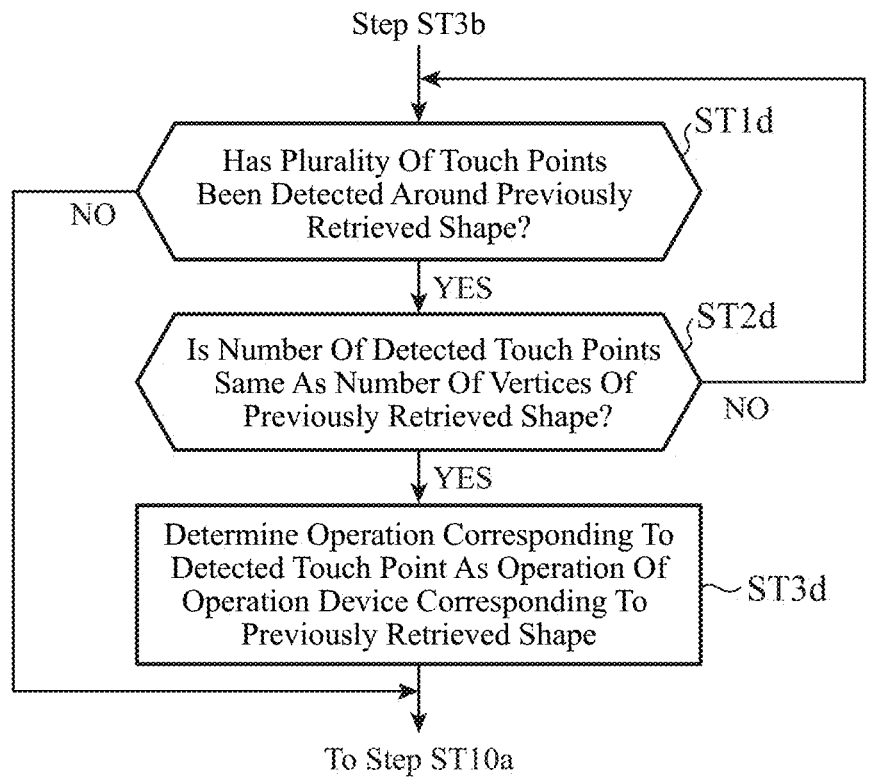
FIG. 23 is a flowchart showing an operation determination method according to the third embodiment.

FIG. 23 is a flowchart showing an operation determination method according to the third embodiment, and shows a series of processing inserted between step ST3$b$ in FIG. 11 and step ST10$a$ in FIG. 5. When the process of step ST3$b$ is completed, the operation determination unit 41B checks whether or not a plurality of touch points has been detected from around the previously retrieved shape (step ST1$d$). For example, the operation determination unit 41B checks whether or not a touch point is newly detected from around the shape determined to correspond to the operation of the operation device 2 among the shapes with the touch points registered in the vertex list as vertices.

Here, if a plurality of touch points is not detected from around the previously retrieved shape (NO in step ST1$d$), the operation determination unit 41B proceeds to the process of step ST10$a$.

When a plurality of touch points is detected by the touch point detecting unit 40B from around the previously retrieved shape (NO in step ST1$d$), the operation determination unit 41B determines whether or not the number of detected touch points is the same as the number of touch points previously retrieved (step ST2$d$). Here, it is determined whether or not the number of touch points detected in step ST1$d$ is the same as the number of touch points previously determined to correspond to the operation of the operation device 2.

When the number of touch points detected in step ST1$d$ is different from the number of touch points having a previously retrieved shape (NO in step ST2$d$), the operation determination unit 41B returns to the process of step ST1$d$ and repeats the above process.

When the number of touch points detected in step ST1$d$ is the same as the number of touch points having a previously retrieved shape (YES in step ST2$d$), the operation determination unit 41B proceeds to step ST3$d$.

Figure 24:
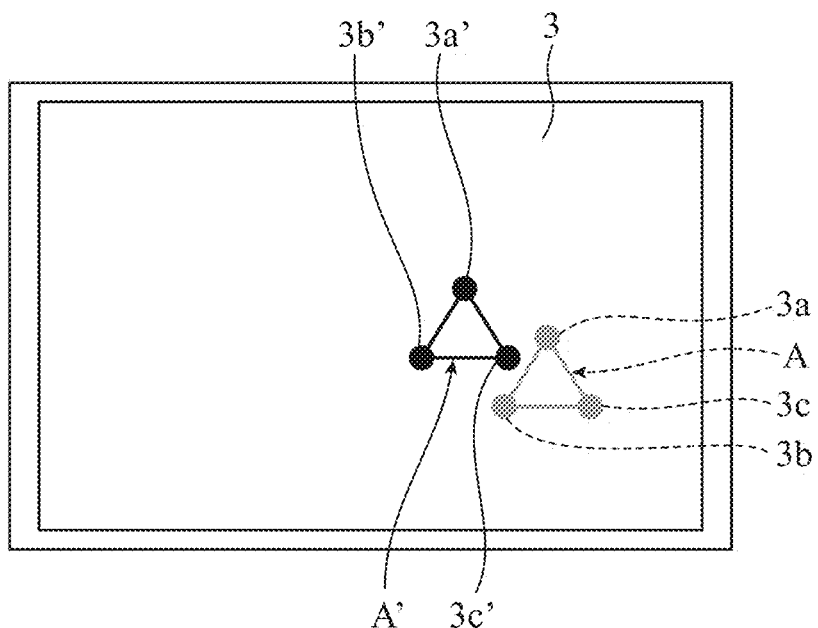
FIG. 24 is a diagram showing a case where a plurality of touch points forming the same shape is detected around a previously retrieved shape.

FIG. 24 is a diagram illustrating a case where a plurality of touch points forming the same shape is detected around the previously retrieved shape. In FIG. 24, the shape A is an equilateral triangle with the touch points 3$a$ to 3$c$ that have been previously determined to correspond to the operation of the operation device 2 as vertices. When the number of touch points 3$a$ to 3$c$ forming the shape A is the same as the number of touch points 3$a'$ to 3$c'$ detected in step ST1$d$, as shown by the arrows in FIG. 24, it is determined that the operation device 2 corresponding to the shape A is slid on the touch panel 3 by the operator, and the touch points 3$a'$ to 3$c'$ forming a shape A' are detected.

Therefore, the operation determination unit 41B determines the operation corresponding to the touch points 3$a'$ to 3$c'$ detected in step ST1$d$ as an operation of the operation device 2 corresponding to the previously retrieved shape A (step ST3$d$). Thereafter, the operation determination unit 41B proceeds to a process of step ST10$a$. This eliminates the need to perform the process shown in steps ST1$b$ and ST2$b$ in FIG. 11 on the touch point newly detected in step ST1$d$, thereby reducing the processing amount required for determining the operation of the operation device 2.

As described above, in the operation input device 4B according to the third embodiment, the operation determination unit 41B, when a plurality of touch points is detected around the previously retrieved shape, determines an operation corresponding to the detected touch points as an operation of the operation device 2 corresponding to the previously retrieved shape.

With this configuration, it is possible to reduce the processing amount required for determining the operation of the operation device 2.

Fourth Embodiment

Figure 25:
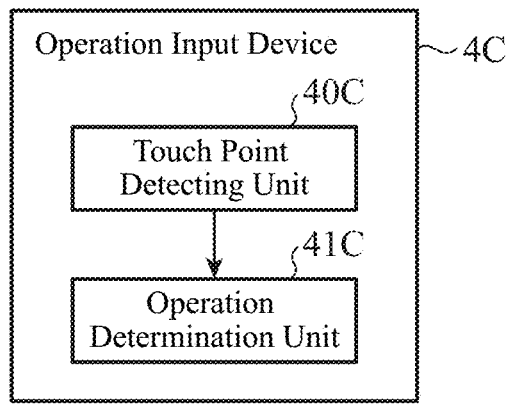
FIG. 25 is a block diagram showing a configuration of an operation input device according to a fourth embodiment of the present invention.

FIG. 25 is a block diagram showing a configuration of an operation input device 4C according to a fourth embodiment of the present invention. As in the first embodiment, the operation input device 4C is an operation input device included in the information processing system 1 illustrated in FIG. 1, detects a touch point corresponding to an operation received by the touch panel 3, and determines a type of operation corresponding to the detected touch point.

For example, the operation input device 4C determines whether the type of operation corresponding to the touch point on the touch panel 3 is an operator's touch operation, an operation of one operation device 2, an operation obtained by combining operations of a plurality of operation devices 2, or an operation obtained by combining an operator's touch operation and an operation of one or a plurality of operation devices 2.

The process corresponding to the operation determined by the operation input device 4C is determined by the process determination unit 5 shown in FIG. 1. Further, the process execution unit 6 executes the process determined by the process determination unit 5. Note that, although FIG. 25 illustrates a configuration in which the operation input device 4C does not include the process determination unit 5 and the process execution unit 6, each of the process determination unit 5 and the process execution unit 6 may be a constituent element included in the operation input device 4C.

The operation input device 4C includes a touch point detecting unit 40C and an operation determination unit 41C. The touch point detecting unit 40C detects a touch point on the touch panel 3. The operation determination unit 41C determines an operation of one or a plurality of operation devices 2 arranged on the touch panel 3 on the basis of the distance and the positional relationship between touch points at a plurality of touch points detected by the touch point detecting unit 40C. In addition, the operation determination unit 41C determines an operation corresponding to a touch point that does not depend on the operation device 2 as a touch operation on the touch panel 3.

The operation determination unit 41C determines whether the touch point registered in the vertex list is a touch point by the operation device 2 or a touch point by a touch operation on the basis of at least one of the electrostatic capacitance detected at the touch point, the contact state of the touched object at the touch point, and the change in the position coordinates of the touch point.

In many cases, the detected value of the electrostatic capacitance, the contact area, and the depressing pressure at the touch point are larger for the operator's finger than the conductor columnar support of the operation device 2.

Therefore, among the plurality of touch points having the same or similar shape, the operation determination unit 41C determines that the one at which the detected value of the electrostatic capacitance, the contact area, and the depressing pressure are large is a touch point by the operator's finger, and determines that the one at which these are small is a touch point by the operation device 2.

Further, the position coordinates of the touch point by the operator's finger are not stable and slightly change compared to the operation device 2 mechanically arranged on the touch panel 3.

Therefore, among a plurality of touch points having the same or similar shape, the operation determination unit 41C determines a touch point with a slight change in position coordinates as a touch point by the operator's finger.

By doing in this way, it is not determined that the shape with the touch points by the operator's finger as vertices corresponds to the operation device 2, and the accuracy of the operation determination can be improved.

The functions of the touch point detecting unit 40C and the operation determination unit 41C are implemented by a processing circuit. That is, the operation input device 4C includes a processing circuit for executing the processing shown in FIGS. 4 and 26. The processing circuit may be the processing circuit 103 of the dedicated hardware shown in FIG. 2A or the processor 104 that executes a program stored in the memory 105 shown in FIG. 2B.

The operation will be described next.

Figure 26:
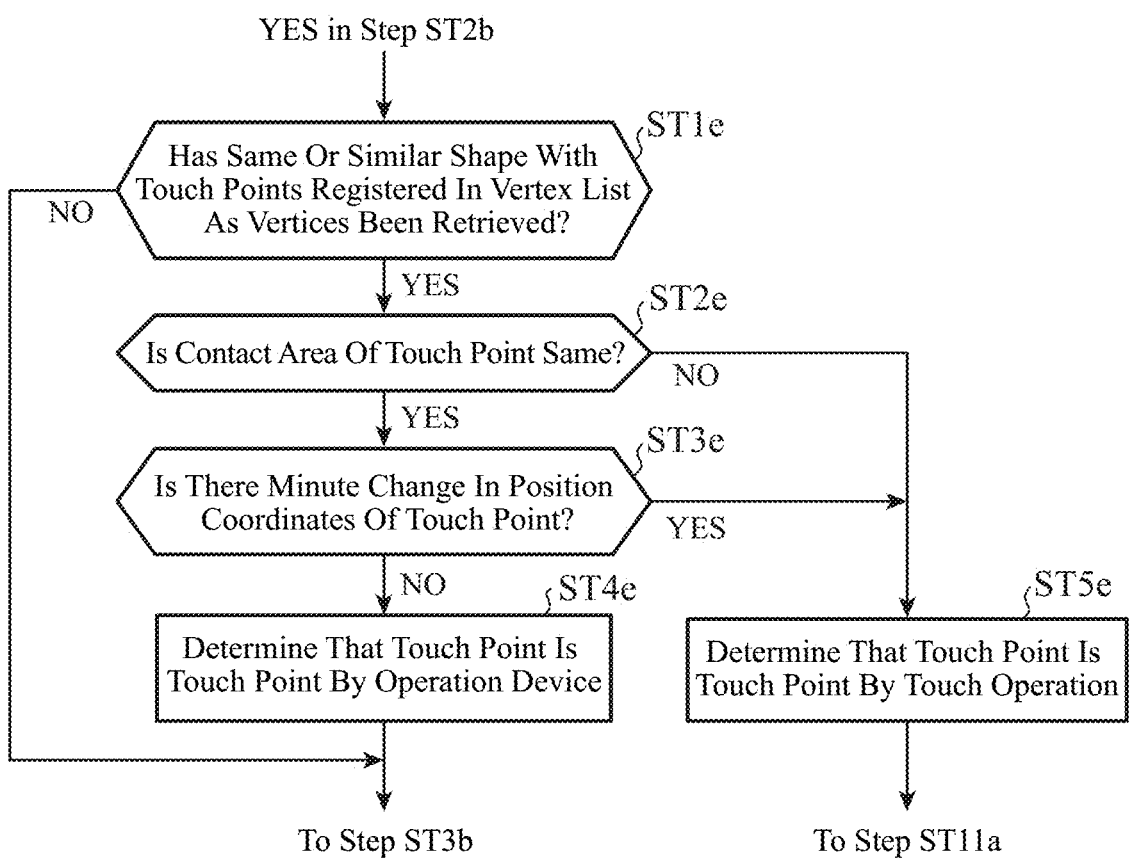
FIG. 26 is a flowchart showing an operation determination method according to the fourth embodiment.

FIG. 26 is a flowchart showing an operation determination method according to the fourth embodiment, and shows a series of processing inserted between step ST2b and step ST3b in FIG. 11.

When all the touch points registered in the vertex list fall within the range of ±allowable error of the circle radius from the center (YES in step ST2b), the operation determination unit 41C determines whether or not the same or similar shape with the touch points registered in the vertex list as vertices has been retrieved (step ST1e). When the same or similar shape has not been retrieved (NO in step ST1e), the operation determination unit 41C proceeds to the process of step ST3b.

On the other hand, when a plurality of the same or similar shapes has been retrieved (YES in step ST1e), the operation determination unit 41C determines whether or not the contact areas of all the touch points registered in the vertex list are the same (step ST2e).

For example, the operation determination unit 41C compares the difference in contact area at the touch point included in the touch information with a threshold value, and determines that if the difference in the contact area is equal to or less than the threshold value, the contact areas are the same, and determines that if the difference in the contact area exceeds the threshold value, the contact areas are different. When the contact areas at the touch points are different, the operation determination unit 41C determines a touch point having the contact area larger than the threshold value.

Figure 27:
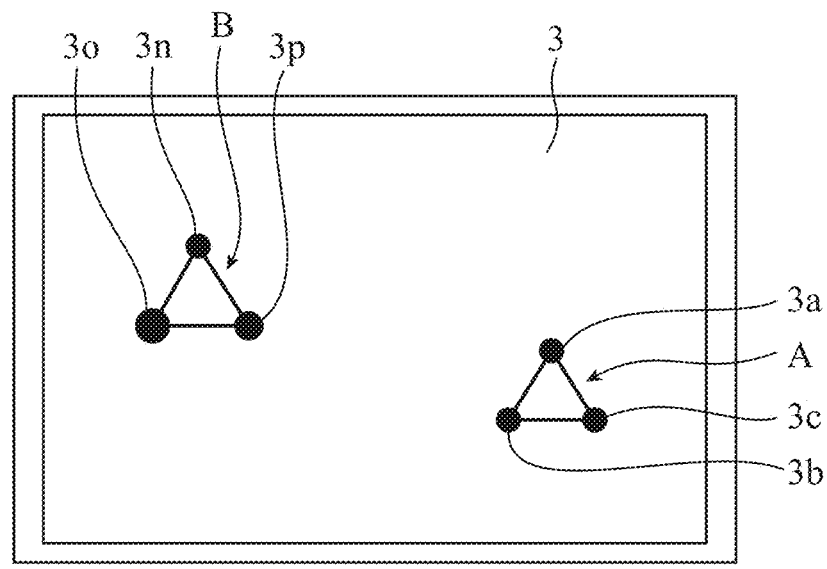
FIG. 27 is a diagram showing a shape corresponding to the operation device and a shape having different contact areas at touch points as vertices.

FIG. 27 is a diagram illustrating a shape A corresponding to the operation device 2 and a shape B having different contact areas at the touch points as vertices. In FIG. 27, an equilateral triangle with each of the touch points 3a to 3c as a vertex is the shape A corresponding to the operation device 2. At touch points 3n to 3p in the shape B, the contact area of the touched object at the touch point 3n is the smallest, the contact area of the touched object at the touch point 3o is the largest, and the contact area of the touched object at the touch point 3p is the second largest. When the contact area of the touched object at the touch point is large like this, it is considered that the operator is creating an equilateral triangle by the touch operation.

When it is determined that the contact area of the touched object at the touch point is different (NO in step ST2e), the operation determination unit 41C determines the touch point having a large contact area as a touch point by the touch operation (step ST5e). In the example of FIG. 27, it is determined that the touch point 3o and the touch point 3p each having a large contact area are touch points by the operator's finger.

Note that, although the contact area of the touched object is used as the determination criterion, at least one of the detected value of the electrostatic capacitance at the touch point, the contact area of the touched object, and the depressing pressure may be used as the determination criterion.

When it is determined that the contact area of the touched object at the touch point is the same (YES in step ST2e), the operation determination unit 41C determines whether or not there is a minute change in the position coordinates of the touch point registered in the vertex list (step ST3e).

For example, the operation determination unit 41C instructs the touch point detecting unit 40C to detect the touch points registered in the vertex list again. The touch point detecting unit 40C detects the touch points registered in the vertex list again in accordance with the instruction from the operation determination unit 41C, and outputs touch information regarding the touch points detected again to the operation determination unit 41C. The operation determination unit 41C compares the difference of the position coordinate of the touch point included in the touch information with a threshold value, and determines that if the difference of the position coordinate is equal to or less than the threshold value, there is no minute change in the position coordinates, and determines that if the difference of the position coordinate exceeds the threshold value, there is a minute change in the position coordinates.

Figure 28:
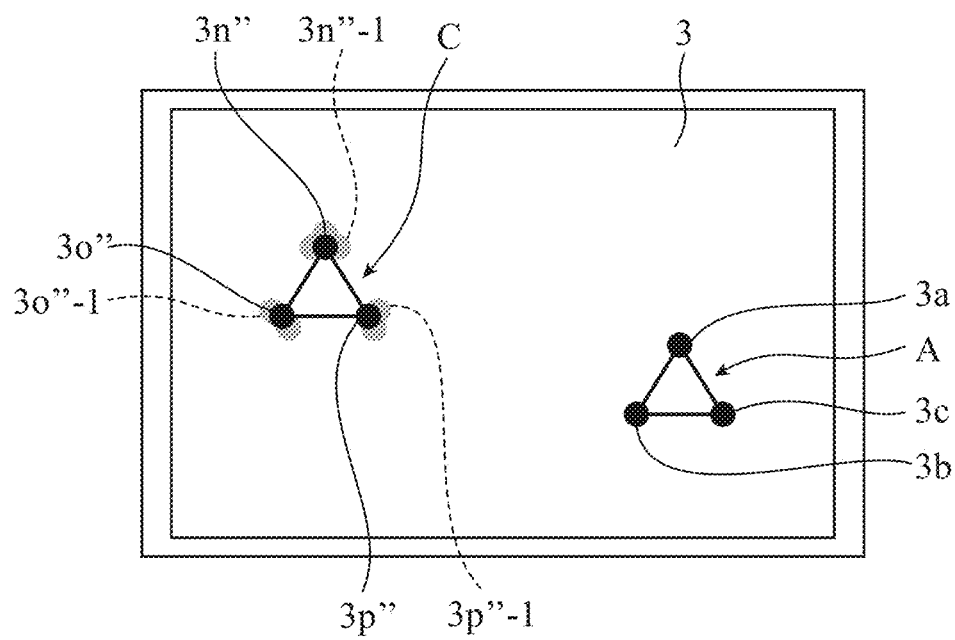
FIG. 28 is a diagram showing a shape corresponding to the operation device and a shape having a minute change in each of position coordinates of touch points as vertices.

FIG. 28 is a diagram showing the shape A corresponding to the operation device 2 and a shape C having a minute change in the position coordinates of the touch points as vertices. In FIG. 27, an equilateral triangle with each of the touch points 3a to 3c as a vertex is the shape A corresponding to the operation device 2. Touch points 3n" to 3p" in the shape C are changed to touch points 3n"-1 to 3p"-1 by slightly changing the position coordinates from the timing registered in the vertex list. In this case, it is considered that the operator is performing the touch operation of an equilateral triangle with a finger.

Here, when it is determined that there is no minute change in the position coordinates of the touch point (NO in step ST3e), the operation determination unit 41C determines that a touch point having no minute change in the position coordinates is a touch point by the operation device 2 (step ST4e). Thereafter, the process proceeds to the process of step ST3b in FIG. 11. Alternatively, the process may proceed to the process of step ST2c in FIG. 20.

On the other hand, when it is determined that there is a minute change in the position coordinates of the touch point (YES in step ST3e), the operation determination unit 41C determines that the touch point having a minute change in the position coordinates is a touch point by the touch operation (step ST5e). Thereafter, the process proceeds to the process of step ST11a in FIG. 5.

As described above, in the operation input device 4C according to the fourth embodiment, the operation determination unit 41C determines whether the touch point is a touch point by the operation device 2 or a touch point by a touch operation on the basis of at least one of the electrostatic capacitance detected at the touch point, the contact state of the touched object at the touch point, and the change in the position coordinates of the touch point.

With this configuration, it is not determined that the shape with the touch points by the operator's finger as vertices corresponds to the operation device 2, and the accuracy of the operation determination can be improved.

It should be noted that the present invention is not limited to the above-described embodiments, and within the scope of the present invention, free combination of each of the embodiments, modification of any constituent element of each of the embodiments, or omission of any constituent element of each of the embodiments can be made.

INDUSTRIAL APPLICABILITY

Since the operation input device according to the present invention can increase the types of operations that can be received, it is suitable as an operation input device for an information processing device having various functions, for example, an in-vehicle information processing device.

REFERENCE SIGNS LIST

1: Information processing system, 2, 102: Operation device, 3, 101: Touch panel, 3a to 3p, 3a' to 3c', 3f to 3h', 3n'' to 3p'', 3n''-1 to 3p''-1: Touch point, 4, 4A to 4C: Operation input device, 5: Process determination unit, 6: Process execution unit, 7a, 7b, 8a, 8b: Side, 9: Center, 10: Circle, 20a to 20c: Conductor columnar support, 21: Side wall part, 22: Bottom surface part, 40, 40A to 40C: Touch point detecting unit, 41, 41A to 41C: Operation determination unit, 100: Display device, 103: Processing circuit, 104: Processor, 105: Memory.

The invention claimed is:

1. An operation input device comprising:
a processor; and
a memory storing instructions which, when executed by the processor, causes the processor to perform processes of:
detecting a touch point on a touch panel; and
determining an operation of one or a plurality of operation devices arranged on the touch panel on a basis of a distance between touch points specified from information on detected touch points and a positional relationship of three or more touch points, and determining an operation corresponding to a touch point that is determined not to depend on the operation device in the determination as a touch operation on the touch panel, wherein the processor detects each of a plurality of conductor columnar supports provided in the operation device as a touch point, and
the processor retrieves, from among shapes with touch points as vertices, a shape in which a distance and a positional relationship between the touch points are within an allowable range of a distance and a positional relationship between the conductor columnar supports of the operation device, and determines an operation corresponding to the touch points as vertices of the retrieved shape as an operation of the operation device.

2. The operation input device according to claim 1, wherein when a same or similar shape is retrieved, the processor repeats a retrieving process of the shape until a difference is recognized between the same or similar shapes.

3. The operation input device according to claim 1, wherein when a plurality of touch points is detected around a previously retrieved shape, the processor determines an operation corresponding to the detected touch points as an operation of the operation device corresponding to the previously retrieved shape.

4. The operation input device according to claim 1, wherein the processor determines whether the touch point is a touch point by the operation device or a touch point by the touch operation on a basis of at least one of an electrostatic capacitance detected at the touch point, a contact state of a touched object at the touch point, and a change in position coordinates of the touch point.

5. The operation input device according to claim 1, wherein the processor does not retrieve a same or similar shape.

6. The operation input device according to claim 1, wherein the processor retrieves a shape in the allowable range selected on a basis of a priority order given to a shape with conductor columnar supports of the operation device as vertices from among shapes with touch points as vertices.

7. An information processing system comprising:
one or a plurality of operation devices;
a touch panel on which one or the plurality of operation devices is arranged;
a processor; and
a memory storing instructions which, when executed by the processor, causes the processor to perform processes of:
detecting a touch point on the touch panel, and determining an operation of one or the plurality of operation devices on a basis of a distance between touch points specified from information on detected touch points and a positional relationship of three or more touch points, and determining an operation corresponding to a touch point that is determined not to depend on the operation device in the determination as a touch operation on the touch panel, detecting each of a plurality of conductor columnar supports provided in the operation device as a touch point, retrieving, from among shapes with touch points as vertices, a shape in which a distance and a positional relationship between the touch points are within an allowable range of a distance and a positional relationship between the conductor columnar supports of the operation device, and determining an operation corresponding to the touch points as vertices of the retrieved shape as an operation of the operation device;
determining a process corresponding to the determined operation; and
executing the determined process.

8. An operation determination method comprising:
  detecting a touch point on a touch panel; and
  determining an operation of one or a plurality of operation devices arranged on the touch panel on a basis of a distance between touch points specified from information on detected touch points and a positional relationship of three or more touch points, and determining an operation corresponding to a touch point that is determined not to depend on the operation device in the determination as a touch operation on the touch panel;
  detecting each of a plurality of conductor columnar supports provided in the operation device as a touch point;
  retrieving, from among shapes with touch points as vertices, a shape in which a distance and a positional relationship between the touch points are within an allowable range of a distance and a positional relationship between the conductor columnar supports of the operation device; and
  determining an operation corresponding to the touch points as vertices of the retrieved shape as an operation of the operation device.

* * * * *